(12) United States Patent
Waller et al.

(10) Patent No.: US 11,368,755 B2
(45) Date of Patent: Jun. 21, 2022

(54) APPARATUS AND METHOD FOR PROCESSING CONDITIONAL ACCESS SYSTEM-BASED CONTENT

(71) Applicant: SAMSUNG ELECTRONICS CO., LTD., Suwon-si (KR)

(72) Inventors: Arthur Simon Waller, Staines (GB); Jonathan Naughton-Green, Staines (GB)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/254,675

(22) PCT Filed: Jun. 21, 2019

(86) PCT No.: PCT/KR2019/007492
§ 371 (c)(1),
(2) Date: Dec. 21, 2020

(87) PCT Pub. No.: WO2019/245318
PCT Pub. Date: Dec. 26, 2019

(65) Prior Publication Data
US 2021/0227295 A1 Jul. 22, 2021

(30) Foreign Application Priority Data

Jun. 22, 2018 (GB) .................................... 1810287
Jun. 12, 2019 (KR) ...................... 10-2019-0069555

(51) Int. Cl.
*H04N 21/4623* (2011.01)
*H04N 21/418* (2011.01)
*H04N 21/4385* (2011.01)

(52) U.S. Cl.
CPC ..... *H04N 21/4623* (2013.01); *H04N 21/4182* (2013.01); *H04N 21/4385* (2013.01)

(58) Field of Classification Search
CPC .......... H04N 21/4623; H04N 21/4182; H04N 21/4385
See application file for complete search history.

(56) References Cited

U.S. PATENT DOCUMENTS 9,043,827 B1 * 5/2015 Rapoport .............. H04L 9/0822
725/31
10,091,537 B2 10/2018 Wendling
(Continued)

FOREIGN PATENT DOCUMENTS

| CN | 103975604 A | 8/2014 |
|---|---|---|
| ER | 2 207 340 A1 | 7/2010 |

(Continued)

OTHER PUBLICATIONS

International Search Report (PCT/ISA/210) and Written Opinion (PCT/ISA/237) dated Sep. 25, 2019 issued by the International Searching Authority in International Application No. PCT/KR2019/007492.

(Continued)

*Primary Examiner* — James R Sheleheda
(74) *Attorney, Agent, or Firm* — Sughrue Mion, PLLC

(57) ABSTRACT

Provided are an apparatus and a method for processing conditional access system (CAS)-based content. A method of operating a broadcast receiving apparatus includes: receiving a broadcast stream that includes content encrypted based on a CAS; extracting, from the received broadcast stream, CAS information for decrypting the encrypted content; receiving an entitlement control message (ECM) having a preset format based on the CAS information generated in a different format for each broadcasting business operator; and displaying the content decrypted based on the ECM.

15 Claims, 14 Drawing Sheets

(56) References Cited

U.S. PATENT DOCUMENTS

| | | | |
|---|---|---|---|
| 2005/0091697 A1* | 4/2005 | Tanaka | H04N 21/4184 348/553 |
| 2005/0105732 A1* | 5/2005 | Hutchings | H04N 21/2543 713/168 |
| 2005/0226417 A1* | 10/2005 | Kubota | H04N 21/2365 375/E7.022 |
| 2006/0059342 A1* | 3/2006 | Medvinsky | H04N 21/26613 713/168 |
| 2006/0107285 A1* | 5/2006 | Medvinsky | H04N 21/835 725/86 |
| 2006/0115083 A1* | 6/2006 | Candelore | H04N 21/23476 380/216 |
| 2007/0265966 A1 | 11/2007 | Kahn et al. | |
| 2008/0134167 A1* | 6/2008 | Chae | H04N 21/8193 375/E7.009 |
| 2009/0028331 A1* | 1/2009 | Millar | H04N 7/17318 380/255 |
| 2009/0288151 A1 | 11/2009 | Agahi | |
| 2009/0300673 A1* | 12/2009 | Bachet | H04N 21/632 725/31 |
| 2011/0131413 A1 | 6/2011 | Moon et al. | |
| 2012/0275597 A1* | 11/2012 | Knox | G06F 21/10 380/210 |
| 2013/0166906 A1 | 6/2013 | Swaminathan et al. | |
| 2014/0298154 A1* | 10/2014 | He | G06F 9/44526 715/234 |
| 2016/0360283 A1 | 12/2016 | Kitahara et al. | |
| 2019/0268665 A1 | 8/2019 | Yang et al. | |

FOREIGN PATENT DOCUMENTS

| | | |
|---|---|---|
| JP | 2010161505 A * | 7/2010 |
| KR | 100976573 B1 | 8/2010 |
| KR | 10-2010-0136104 A | 12/2010 |
| KR | 101085575 B1 | 11/2011 |
| KR | 101315799 B1 | 10/2013 |
| KR | 101768045 B1 | 8/2017 |
| KR | 1020180046674 A | 5/2018 |

OTHER PUBLICATIONS

Communication dated Dec. 14, 2018 issued by the Intellectual Property Office of the United Kingdom in United Kingdom Patent Application No. GB1810287.1.

Communication dated Dec. 13, 2018 issued by the Intellectual Property Office of the United Kingdom in United Kingdom Patent Application No. GB1810287.1.

Communication dated May 18, 2021 issued by the European Patent Office in European Application No. 19822727.4.

Communication dated May 9, 2022 by the China National Intellectual Property Administration in Chinese Patent Application No. 201980041825.9.

* cited by examiner

APPARATUS AND METHOD FOR PROCESSING CONDITIONAL ACCESS SYSTEM-BASED CONTENT

TECHNICAL FIELD

The present disclosure relates to an apparatus and a method for processing conditional access system (CAS)-based content.

BACKGROUND ART

Broadcast content such as television (TV) or radio programs may be received, within a range of transmitters such as TV or radio receivers, by any apparatus compatible therewith. In some cases, broadcasting companies may want to apply some type of protection to broadcast content such that only receivers given a certain authority are allowed to access the content.

TV broadcasts change from analog broadcasts to digital broadcasts, and set-top boxes may be required to provide digital broadcasts. TVs may receive various digital broadcasts by using set-top boxes. Conditional access system (CAS) information including information about accessible channels by each subscriber may be embedded in set-top boxes. This may allow broadcasting companies to provide broadcast services corresponding to subscription information of subscribers. CASs are systems capable of providing conditional access services. Specifically, the CASs are systems allowing only subscribers authorized to receive scrambled signals, which are transmitted by broadcast transmitters, to watch programs by descrambling the signals received by broadcast receivers. Accordingly, the CASs may differentiate and provide accessible channels or the type or quality of content, according to costs paid for broadcast services or content.

Recently, the CASs may be embedded or implemented in external devices, such as common interface conditional access modules (CICAMs). However, when proprietary CAS software for particular CASs is embedded in TVs, for example, the embedded CAS software needs to be frequently updated during the lifespan of the TVs as a result of changes to the CASs. Systems using external devices to implement a CAS in a receiver, such as CAS dongles connected to TVs, may have drawbacks of additional costs and complexity related to installing and providing hardware required at receiver-ends. Therefore, there is a need for an improved method of implementing a CAS in a broadcast receiver.

DESCRIPTION OF EMBODIMENTS

Technical Problem

Some embodiments of the present disclosure may provide an apparatus and a method for processing conditional access system (CAS)-based content, by providing an entitlement control message (ECM) capable of being decoded by a broadcast receiving apparatus.

Technical Solution to Problem

According to an aspect of the present disclosure, a method of operating a broadcast receiving apparatus includes: receiving a broadcast stream that includes content encrypted based on a conditional access system (CAS); extracting, from the received broadcast stream, CAS information for decrypting the encrypted content; receiving an entitlement control message (ECM) having a preset format based on the CAS information generated in a different format for each broadcasting business operator; and displaying the content decrypted based on the ECM.

The ECM may be received from an external electronic device.

The displaying of the content may include decrypting the content by using control information generated based on the ECM.

The CAS information may include identification information for identifying at least one of a plurality of CASs, and ECM information related to an authority to receive the content.

The method may further include: generating a hash based on the ECM information; and generating a uniform resource locator (URL) based on the hash and the identification information, wherein the receiving of the ECM may include receiving the ECM based on the URL.

The receiving of the ECM may include: retrieving the external electronic device corresponding to the URL; and receiving the ECM corresponding to the CAS information from the external electronic device.

According to another aspect of the present disclosure, a method of operating a broadcast providing apparatus includes: encrypting content based on a conditional access system (CAS); generating CAS information for decrypting the content; generating an entitlement control message (ECM) in a preset format, based on the CAS information; transmitting a broadcast stream including the content and the CAS information to a broadcast receiving apparatus; and transmitting the ECM to the broadcast receiving apparatus, according to a request from the broadcast receiving apparatus.

The transmitting of the ECM to the broadcast receiving apparatus may include transmitting the ECM to the broadcast receiving apparatus via an external electronic device.

The encrypting of the content may include: generating control information based on the CAS; and encrypting the content by using the control information.

The CAS information may include identification information for identifying at least one of a plurality of CASs, and ECM information related to entitlement to receive the content.

According to yet another aspect of the present disclosure, a broadcast receiving apparatus includes: a display; a communication unit; a memory storing at least one instruction; and at least one processor configured to execute the at least one instruction to control the broadcast receiving apparatus, wherein the at least one processor is configured to execute the at least one instruction to: receive a broadcast stream that includes content encrypted based on a conditional access system (CAS); extract, from the received broadcast stream, CAS information for decrypting the encrypted content; receive an entitlement control message (ECM) having a preset format based on the CAS information generated in a different format for each broadcasting business operator; and display the content decrypted based on the ECM.

According to yet another aspect of the present disclosure, a broadcast providing apparatus includes: a communication unit; a memory storing at least one instruction; and at least one processor configured to execute the at least one instruction to control the broadcast providing apparatus, wherein the at least one processor is configured to execute the at least one instruction to: encrypt content based on a conditional access system (CAS); generate CAS information for decrypting the content; generate an entitlement control message (ECM) in a preset format, based on the CAS information; transmit a broadcast stream including the content and the CAS information to a broadcast receiving apparatus; and transmit the ECM to the broadcast receiving apparatus, according to a request from the broadcast receiving apparatus.

According to yet another aspect of the present disclosure, there is a provided a computer-readable recording medium having stored therein a program for performing: receiving a broadcast stream that includes content encrypted based on a conditional access system (CAS); extracting, from the received broadcast stream, CAS information for decrypting the encrypted content; receiving an entitlement control message (ECM) having a preset format based on the CAS information generated in a different format for each broadcasting business operator; and displaying the content decrypted based on the ECM.

BRIEF DESCRIPTION OF DRAWINGS

Embodiments of the present disclosure will be described merely as examples with reference to the accompanying drawings in which.

MODE OF DISCLOSURE

Figure 1:
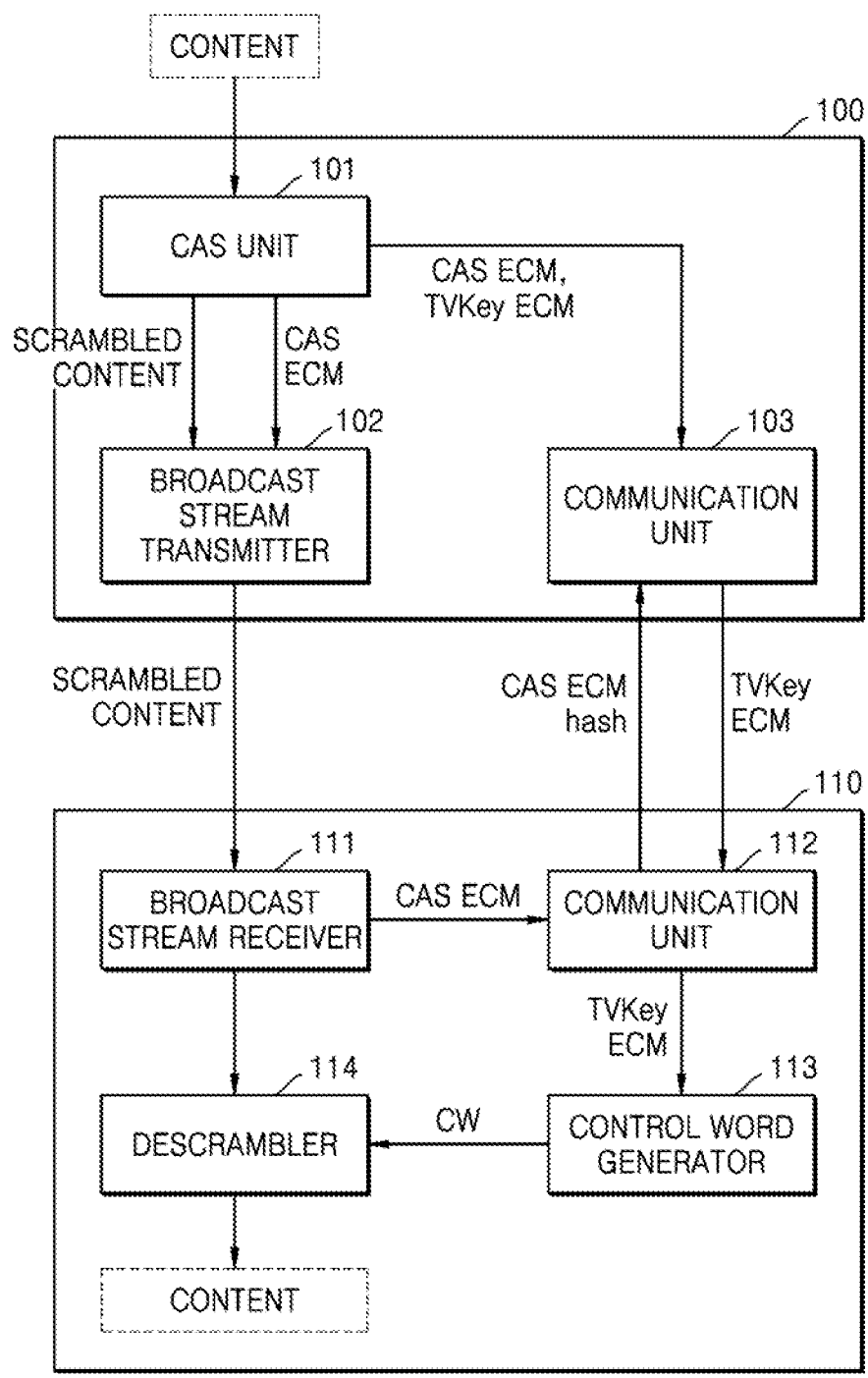
FIG. 1 illustrates a broadcast providing system including a broadcast receiving apparatus and a broadcast providing apparatus, according to an embodiment of the present disclosure.

Hereinafter, embodiments of the present disclosure will be described in detail with reference to the accompanying drawings to allow one of ordinary skill in the art to readily make implementations thereof. However, it should be understood that the present disclosure may be embodied in different ways and is not limited to embodiments described herein. In addition, portions irrelevant to the description will be omitted from the drawings for clarity, and like components will be denoted by like reference numerals throughout the specification.

Throughout the specification, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

A phrase such as "in some embodiments" or "in an embodiment (or in one embodiment)", which appears in various places herein, does not always indicate the same embodiment.

Some embodiments may be represented by functional block components and various processing operations. Some or all of such functional blocks may be implemented by various numbers of hardware and/or software components for performing particular functions. For example, the functional blocks of the present disclosure may be implemented by one or more processors or microprocessors or may be implemented by circuit components for certain functions. In addition, for example, the functional blocks of the present disclosure may be implemented by various programming or scripting languages. The functional blocks may be implemented by algorithms executed by the one or more processors. In addition, the present disclosure may employ techniques according to the related art, for electronic environment settings, signal processing, data processing, and/or the like. Terms such as "module" and "component" may be broadly used and are not limited to mechanical and physical components.

In addition, connection lines or connection members between components illustrated in the drawings merely represent examples of functional connections and/or physical or circuit connections. In actual devices, connections between components may be represented by various functional, physical, or circuit connections, which may be substituted or added.

In addition, the expression "at least one of A or B" indicates "A or B" or "A and B".

Throughout the specification, a conditional access system (CAS), which is a system capable of satisfying conditional access services, refers to a system allowing only subscribers authorized to receive scrambled signals, which are transmitted by broadcast transmitters, to watch programs by descrambling the signals received by broadcast receivers. For example, the CAS refers to a security system for protecting broadcast content through encryption of the broadcast content in various paid broadcast service environments, such as Internet protocol televisions (IPTVs), digital cables, satellites, and digital multimedia broadcasting (DMB), and allowing only authorized subscribers to normally watch paid broadcast content. Hereinafter, the acronym "CAS" for Conditional Access System will be used for convenience of description.

A CAS, in which content is scrambled, based on a control word, by a transmitter and data used to derive the control word, together with the scrambled content, is transmitted as a broadcast stream, has been developed. Accordingly, a receiver, in which certain software is installed, may derive an exact control word from the received data and may descramble the content by using the generated control word.

Figure 2:
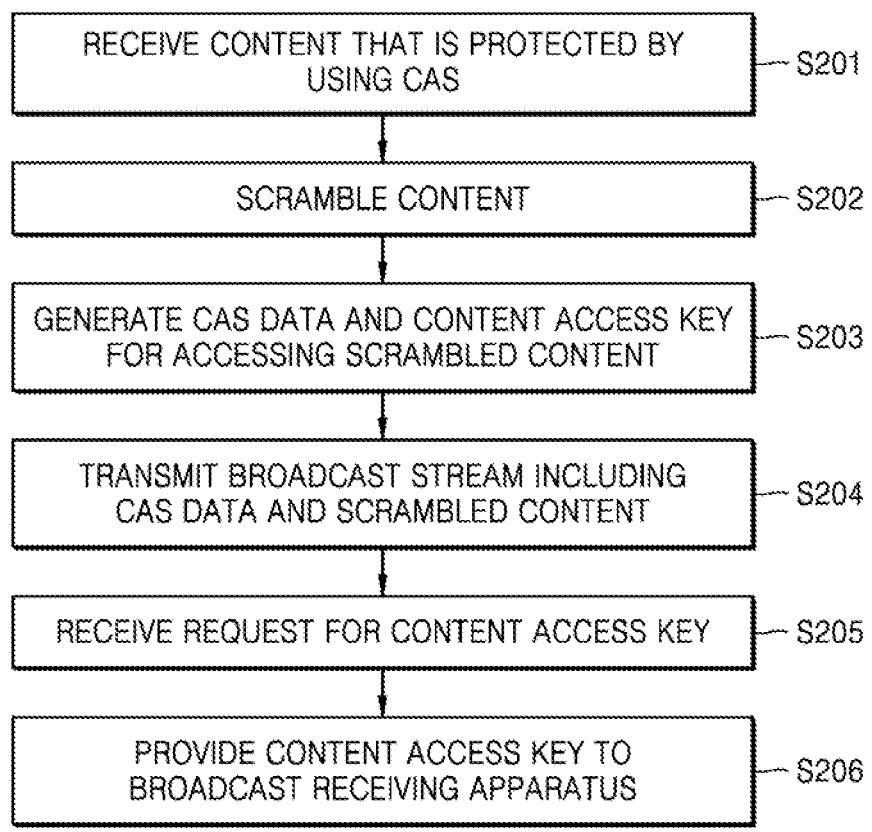
FIG. 2 is a flowchart illustrating a method of providing broadcast content, according to an embodiment of the present disclosure.
Figure 3:
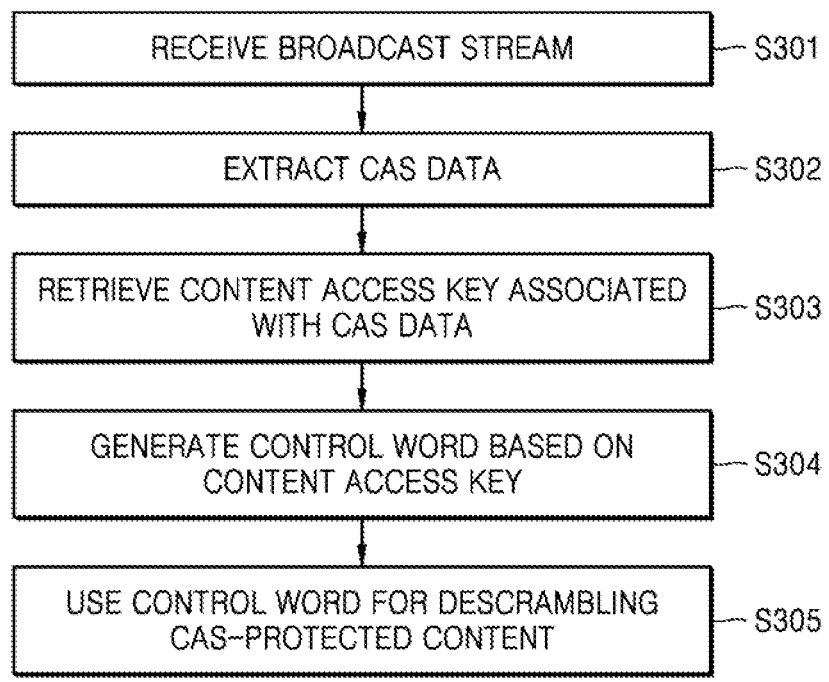
FIG. 3 is a flowchart illustrating a method of receiving broadcast content, according to an embodiment of the present disclosure.

Referring to FIG. 1, a broadcast providing system including a broadcast providing apparatus and a broadcast receiving apparatus, according to an embodiment of the present disclosure, is illustrated. FIGS. 2 and 3 are flowcharts illustrating methods performed by the broadcast providing apparatus and the broadcast receiving apparatus, respectively. A broadcast receiving apparatus 110 may be embedded in various forms, such as TVs or set-top boxes. The broadcast receiving apparatus 110 is configured to receive a broadcast stream from a broadcast providing apparatus 100. According to an embodiment of the present disclosure, the broadcast stream may be received through a wireless or wired connection.

In some embodiments of the present disclosure, the broadcast stream may be a multiplex stream including a plurality of multiplex broadcast services. When a multiplex stream is used, an arbitrary number of multiplex services may include content protected by a CAS, and different CASs may be used for different services in the broadcast stream.

The broadcast providing apparatus 100 may include a CAS unit 101, a broadcast stream transmitter 102, and a communication unit 103. The CAS unit 101 may be configured to receive content protected by using a CAS and scramble the received content, which is referred to as CAS-protected content herein, to generate scrambled content. The CAS unit 101 may be configured to generate CAS data for accessing the CAS-protected content and generate a content access key to generate a control word for descrambling the CAS-protected content. The broadcast stream transmitter 102 may be configured to transmit a broadcast stream including the CAS-protected content and the generated CAS data. CAS information may include the CAS data for accessing the CAS-protected content.

The broadcast providing apparatus 100 may include: the CAS unit 101 configured to receive the content protected by using the CAS, scramble the received content to generate the CAS-protected content, and generate the content access key to generate the control word for descrambling the CAS-protected content; the broadcast stream transmitter 102 configured to transmit the broadcast stream including the CAS-protected content and the CAS data; and the communication unit 103 configured to receive a request for the content access key related to the CAS data and provide the generated content access key in response to the received request.

As shown in FIG. 1, the CAS unit 101 may be configured to transmit the scrambled content and the CAS data to the broadcast stream transmitter 102. In an embodiment of the present disclosure, although the CAS unit 101 is configured to provide the CAS data in the form of a CAS entitlement control message (ECM), the CAS data may be provided in different formats in other embodiments of the present disclosure. Hereinafter, the acronym "CAS ECM" for the CAS Entitlement Control Message generated by the broadcast providing apparatus 100 will be used. In addition, in an embodiment of the present disclosure, the CAS unit 101 may be configured to provide the content access key in the form of a TV key ECM according to TV key standards. However, in another embodiment of the present disclosure, the content access key may be provided in a different format.

The broadcast providing apparatus 100 may be configured to store the TV key ECM in association with information for identifying the CAS data related to the content access key. For convenience of description, it is assumed that the broadcast receiving apparatus 110 is a TV. Here, the TV key ECM may have a standard format defined by a TV key. Specifically, the CAS ECM may be generated in a different format for each broadcasting business operator or each CAS vendor, and thus, the broadcast receiving apparatus 110 may not be allowed to directly decode the CAS ECM. Because the TV key ECM has a standard format defined by the TV key, the broadcast receiving apparatus 110 may directly decode the TV key ECM. Because the broadcast providing apparatus 100 stores the TV key ECM in association with the information for identifying the CAS data related to the content access key, the broadcast providing apparatus 100 may retrieve the TV key ECM afterwards in response to a request, which includes information for identifying the CAS data, from the broadcast receiving apparatus 110 and may permit the retrieved TV key ECM to be provided to the broadcast receiving apparatus 110 via the communication unit 103. The CAS information may include the information for identifying the CAS data. For example, the information for identifying the CAS data may be the CAS ECM itself or may be in the form of any other suitable identifier. For example, the TV key ECM, together with the CAS ECM, may be stored in a lookup table. In some embodiments of the present disclosure, the information for identifying the CAS data may be derived from the CAS ECM by using a particular transformation known to both the broadcast providing apparatus 100 and the broadcast receiving apparatus 110. In an embodiment of the present disclosure, the transformation may include a hash function, and the broadcast providing apparatus 100 may be configured to store the TV key ECM associated with transformed data, which is derived from the CAS ECM, particularly, from a hash of the CAS ECM. In another embodiment of the present disclosure, a different type of transformed data, such as an encrypted version of the CAS ECM, may be used.

Still referring to FIG. 1, the broadcast receiving apparatus 110 may include a broadcast stream receiver 111, a communication unit 112, a control word generator 113, and a descrambler 114. In an embodiment of the present disclosure, the broadcast stream receiver 111 may be configured to receive the broadcast stream including the CAS data, which includes the CAS ECM, and the scrambled content. The broadcast stream receiver 111 may be configured to extract the CAS data and transfer the CAS data to the communication unit 112.

The broadcast receiving apparatus 110 may include: the broadcast stream receiver 111 configured to receive the broadcast stream and extract the CAS data from the received broadcast stream, the CAS data including data for accessing the CAS-protected content that is included in the broadcast stream; the communication unit 112 configured to retrieve, from a server, the content access key associated with the extracted CAS data; the control word generator 113 configured to generate a control word for descrambling the CAS-protected content, based on the retrieved content access key; and the descrambler 114 configured to descramble the CAS-protected content by using the generated control word.

In addition, the broadcast stream receiver 111 may be configured to obtain an identifier (ID) from the received broadcast stream, and the communication unit 112 may be configured to identify the server to retrieve the content access key according to the obtained ID by the broadcast stream receiver 111. The ID may include a CAS ID for identifying one of a plurality of CASs related to the received CAS data. In addition, the ID may include a broadcast service ID for identifying one of a plurality of multiplexed services included in the broadcast stream.

The broadcast receiving apparatus 110 may further include a memory (not shown) storing a plurality of server uniform resource locators (URLs) respectively associated with a plurality of IDs, and the communication unit 112 may be configured to identify the server for retrieving the content access key by selecting a server URL stored in association with the ID obtained by the broadcast stream receiver 111.

The content access key refers to a key for decoding the content and may correspond to an ECM generated in a preset format. Specifically, the content access key may correspond to an ECM having a standard format defined by a key of the broadcast receiving apparatus 110.

The communication unit 112 may be configured to communicate with the broadcast providing apparatus 100 via the communication unit 103 to retrieve the content access key associated with the extracted CAS data. Therefore, in an embodiment of the present disclosure, the broadcast providing apparatus 100 may operate as a server for providing the requested content access key to the broadcast receiving apparatus 110, as needed. The communication units 103 and 112 may communicate with each other through any suitable connection. For example, the communication units 103 and 112 may communicate with each other through a suitable network connection by using an internet protocol (IP).

In an embodiment of the present disclosure, after the content access key including the TV key ECM is received via the communication unit 112, the control word generator 113 is configured to generate the control word for descrambling the CAS-protected content, based on the TV key ECM. Then, the descrambler 114 may be configured to descramble the CAS-protected content by using the generated control word. In this manner, the broadcast receiving apparatus 110 may obtain the content that is not scrambled. For example, the content that is not scrambled may then be output to a display and/or an audio system according to the type of the content or be stored for subsequent reproduction.

The content access key may be provided in a standard format, and this may mean that the control word generator 113 uses the same method to generate the control word from the content access key regardless of a CAS used to protect the content. By using the communication unit 112 to request the content access key, the broadcast receiving apparatus 110 may transform the CAS ECM, for example, proprietary broadcast ECMs, into the standard content access key such as TV key ECMs, unlike the case where the content access key is locally generated in the broadcast receiving apparatus 110. In this way, even when the broadcast receiving apparatus 110 does not have specific software for a particular CAS installed, the broadcast receiving apparatus 110 may be allowed to sequentially access the CAS-protected content.

FIG. 2 is a flowchart illustrating a method of providing broadcast content, according to an embodiment of the present disclosure.

Now, the method performed by the broadcast providing apparatus 100 will be described with reference to FIG. 2. First, in operation S201, the broadcast providing apparatus 100 may receive content protected by using a CAS. Specifically, the CAS unit 101 of the broadcast providing apparatus 100 receives the content protected by using the CAS. Next, in operation S202, the CAS unit 101 may scramble the received content to generate CAS-protected content. Next, in operation S203, the CAS unit 101 may generate CAS data for accessing the CAS-protected content, and a content access key for generating a control word capable of being used to descramble the CAS-protected content. In some embodiments of the present disclosure, operation S203 may be performed before operation S202, or operations S202 and S203 may be performed in parallel, that is, substantially at the same time.

Next, in operation S204, the broadcast stream transmitter 102 may transmit a broadcast stream including the CAS-protected content and the generated CAS data. In some embodiments of the present disclosure, operations S203 and S204 may be performed in parallel, that is, substantially at the same time. For example, the broadcast stream transmitter 102 may transmit the CAS-protected content and the generated CAS data as soon as the CAS-protected content and the generated CAS data are received from the CAS unit 101, and may have no need to wait for the content access key to be generated.

After the broadcast stream is transmitted, in operation S205, the communication unit 103 may receive a request for the content access key associated with the CAS data transmitted in operation S204. In response to the received request, in operation S206, the communication unit 103 may provide the content access key to the broadcast receiving apparatus 110. The content access key may include or correspond to a TV key ECM.

FIG. 3 is a flowchart illustrating a method of receiving broadcast content, according to an embodiment of the present disclosure.

Now, the method performed by the broadcast receiving apparatus 110 will be described with reference to FIG. 3. In operation S301, the broadcast stream receiver 111 may receive a broadcast stream. In addition, in operation S302, the broadcast stream receiver 111 may extract CAS data from the received broadcast stream.

Next, in operation S303, the communication unit 112 may communicate with the broadcast providing apparatus 100 via the communication unit 103 to retrieve a content access key associated with the extracted CAS data. In an embodiment of the present disclosure, the communication unit 112 may communicate with the broadcast providing apparatus 100 as follows. First, whenever a new ECM for this CAS is received through the broadcast stream, the broadcast receiving apparatus 110 may generate a hash of the ECM by using a particular algorithm. Second, the communication unit 112 may form a URL by combining a text version of the hashed CAS ECM with a pre-provided URL, which may be referred to as a "root" URL, of the communication unit 103. Third, the communication unit 112 may transmit a request for the content access key to the obtained URL. In this case, an efficient method of requesting the content access key from the communication unit 103 simultaneously with providing information required to retrieve the correct content access key, which is the hash of the CAS ECM, to the communication unit 103 may be provided. According to the above-described method, the broadcast receiving apparatus 110 may retrieve an external electronic device for receiving the content access key associated with the CAS data.

In an embodiment of the present disclosure, when the communication unit 112 communicates with a server, a different method, by which the broadcast providing apparatus 100 combines the root URL with the hash of the CAS ECM, whereby the communication unit 112 retrieves the content access key in other embodiments of the present disclosure, may be used. For example, in some embodiments of the present disclosure, the communication unit 112 may cause a body of the request transmitted to the root URL to include the hash of the CAS ECM, without modifying the root URL. Optionally, in some embodiments of the present disclosure, a copy of the received CAS ECM may not be hashed and may be included in the body of the request transmitted to the server. Alternatively, in some embodiments of the present disclosure, the communication unit 112 may combine the root URL with an ID received through the broadcast stream instead of combining the root URL with the hash of the CAS ECM. It will be understood that the above-described examples are provided for describing different methods, performed by the communication unit 112, of communicating with the server to retrieve the content access key, and that other approaches may be used in other embodiments of the present disclosure.

Still referring to FIG. 3, in operation S304, the control word generator 113 may generate a control word for descrambling CAS-protected content, based on the retrieved content access key.

In addition, in operation S305, the descrambler 114 may descramble the CAS-protected content by using the generated control word. In some embodiments of the present disclosure, the method may further include outputting the descrambled content for audio and/or video reproduction or may further include storing the descrambled content for subsequent reproduction, as described above.

According to embodiments of the present disclosure, the methods performed by the broadcast providing apparatus 100 and the broadcast receiving apparatus 110 may be implemented by hardware or software or implemented by a combination of hardware and software. For example, the broadcast providing apparatus 100 may include a memory as any suitable type of computer-readable storage medium that stores computer program instructions, when executed, performing the method described with reference to FIG. 2. Similarly, in some embodiments of the present disclosure, the broadcast receiving apparatus 110 may include a memory as any suitable type of computer-readable storage medium that stores computer program instructions, when executed, performing the method described with reference to FIG. 3.

Figure 4:
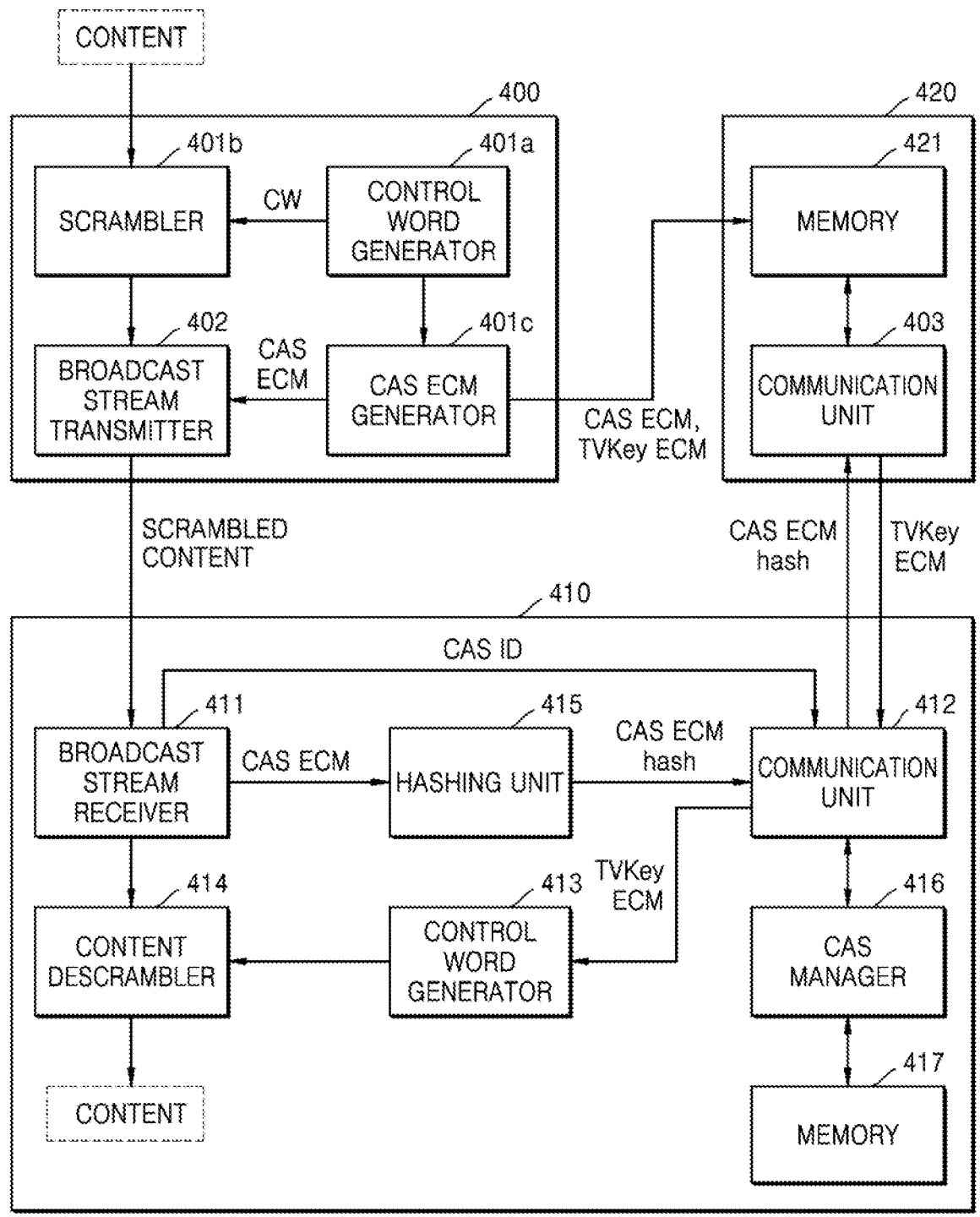
FIG. 4 illustrates a broadcast providing system including a broadcast providing apparatus, a server, and a broadcast receiving apparatus, according to an embodiment of the present disclosure.
Figure 5:
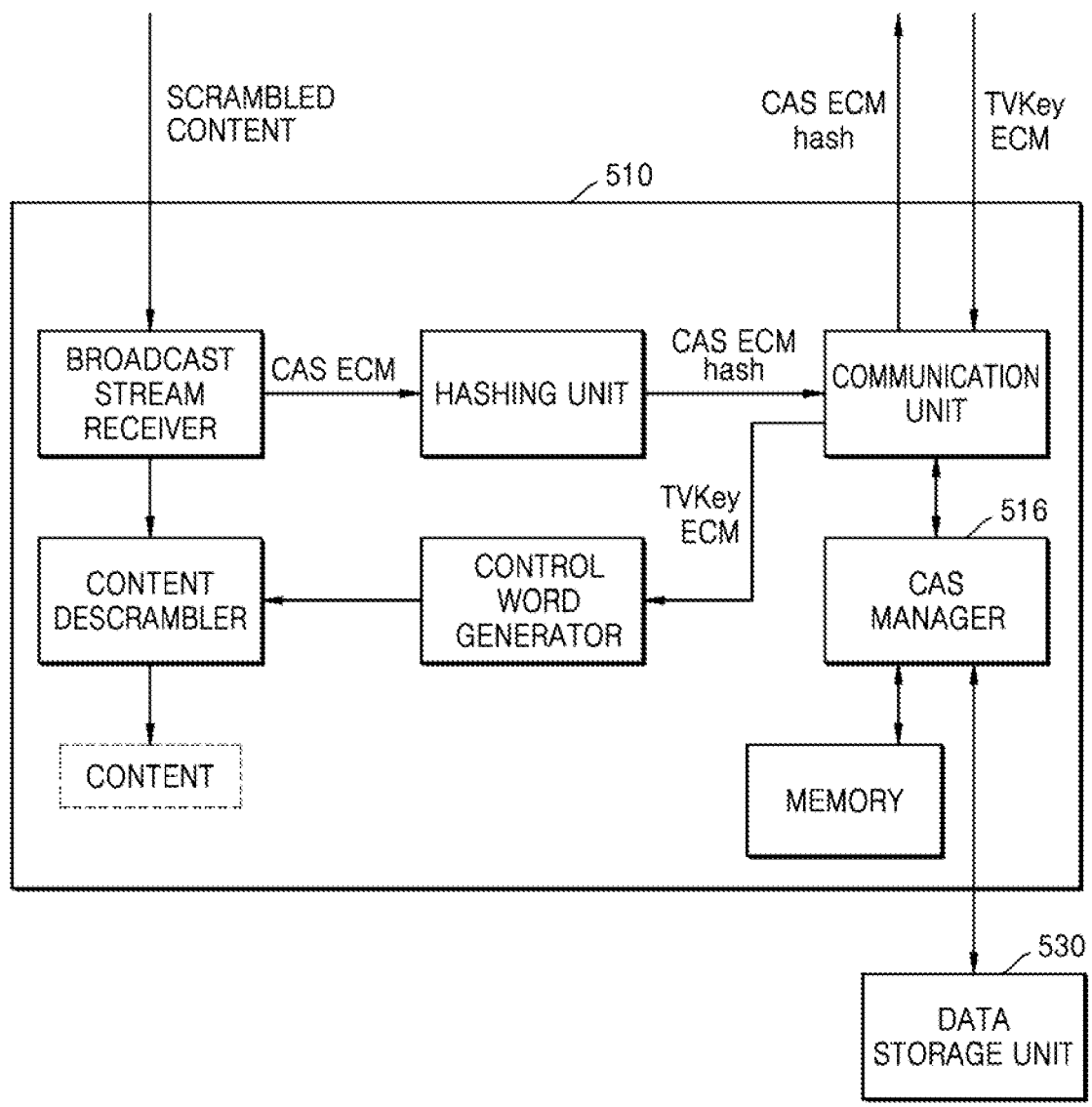
FIG. 5 illustrates a broadcast receiving apparatus connected to a data storage device for updating a conditional access system identifier (CASID) and/or a server uniform resource locator (URL), according to an embodiment of the present disclosure.

FIG. 4 illustrates a broadcast providing system including a broadcast providing apparatus, a server, and a broadcast receiving apparatus, according to an embodiment of the present disclosure. In addition, FIG. 5 illustrates a broadcast receiving apparatus connected to a data storage device for updating a CASID and/or a server URL, according to an embodiment of the present disclosure.

Referring to FIG. 4, according to an embodiment of the present disclosure, the broadcast providing system including the broadcast providing apparatus, the server, and the broadcast receiving apparatus is illustrated. A lot of aspects of the broadcast providing system of FIG. 4 are similar to the aspects of the broadcast providing system described with reference to FIGS. 1, 2, and 3, and repeated descriptions of similar features are omitted for brevity. In some embodiments of the present disclosure, the aspects of the two broadcast providing systems shown in FIGS. 1 and 4 may be combined in a single embodiment.

Like the broadcast providing apparatus 100 of FIG. 1, a broadcast providing apparatus 400 according to an embodiment of the present disclosure may include a CAS unit (401a, 401b, and 401c), a broadcast stream transmitter 402, and a communication unit (not shown). In an embodiment of the present disclosure, the CAS unit (401a, 401b, and 401c) may include a control word generator 401a configured to generate a control word, a scrambler 401b configured to scramble content by using the generated control word, and a CAS ECM generator 401c configured to generate CAS data and a content access key.

In addition, in an embodiment of the present disclosure, a communication unit 403 may be embedded in a server 420 physically separated from the broadcast providing apparatus 400 including the broadcast stream transmitter 402. The server 420 may include a memory 421 configured to receive the content access key and the CAS data from the CAS ECM generator 401c via the communication unit 403 and store the content access key and the CAS data. In addition, to permit the suitable content access key to be subsequently retrieved in response to a request from a broadcast receiving apparatus 410, the memory 421 may store the content access key together with information for identifying the CAS data related to the content access key.

Like the broadcast receiving apparatus 110 of FIG. 1, the broadcast receiving apparatus 410 according to an embodiment of the present disclosure may include a broadcast stream receiver 411, a communication unit 412, a control word generator 413, and a content descrambler 414. In an embodiment of the present disclosure, the broadcast stream receiver 411 may be configured to obtain an ID from a received broadcast stream, and the communication unit 412 may be configured to identify the server 420 for retrieving the content access key according to the ID and receive the ID obtained by the broadcast stream receiver 411. In an embodiment of the present disclosure, the ID may include a CAS ID for identifying one of a plurality of CASs related to the received CAS data.

In another embodiment of the present disclosure, a different type of ID may be used to select the server 420. For example, in some embodiments of the present disclosure, the communication unit 412 may be configured to select the server 420 according to a broadcast service ID for identifying one of a plurality of multiplexed services included in the broadcast stream. In this manner, a suitable CAS server may be automatically selected according to a broadcast service. This approach may also be used when a particular broadcast service always uses the same CAS to protect content. In a digital video broadcasting (DVB) system, for example, the broadcast service ID may be extracted from a DVB triplet.

In an embodiment of the present disclosure, the broadcast receiving apparatus 410 may further include a memory 417 storing a plurality of server URLs respectively associated with a plurality of IDs such as CAS IDs or broadcast service IDs. The communication unit 412 may be configured to identify the server 420 to be used to retrieve the content access key for the current CAS-protected content, by selecting a server URL stored in association with the ID obtained by the broadcast stream receiver 411. By selecting a different server when a different ID is obtained, the broadcast receiving apparatus 410 may operate with a plurality of different CASs and may automatically select the server 420 suitable to provide the content access key for the CAS-protected content that is being currently received by the broadcast stream receiver 411.

The broadcast receiving apparatus 410 may further include a CAS manager 416 configured to update the plurality of server URLs by obtaining a new server URL and storing the obtained new server URL in a memory.

The CAS manager 416 may obtain the new server URL and, when applicable, a corresponding ID such as a CAS ID by a different method, according to an embodiment of the present disclosure. For example, in some embodiments of the present disclosure, the CAS manager 416 may be configured to obtain the new server URL from metadata included in the received broadcast stream. In another embodiment of the present disclosure, the CAS manager 416 may be configured to obtain the new server URL from an internet server via the communication unit 412. Alternatively, in some embodiments of the present disclosure, the CAS manager 416 may be configured to obtain the new server URL from, for example, a local data storage device 530, such as a universal serial bus (USB) memory stick, connected to a broadcast receiving apparatus 510, as in an embodiment shown in FIG. 5.

The CAS manager 416 may be configured to store the new server URL by substituting a previous server URL of one of the plurality of CASs with the new server URL. In addition, the CAS manager 416 may be configured to obtain a CAS ID of a new CAS associated with the new server URL and store the CAS ID obtained in association with the new server URL in the memory 417.

The CAS manager 416 may be configured to obtain the new server URL from the metadata included in the received broadcast stream. The CAS manager 416 may be configured to obtain the new server URL via the communication unit 416. The CAS manager 416 may be configured to obtain the new server URL from a local data storage device connected to the broadcast receiving apparatus 410.

The broadcast receiving apparatus 410 may further include a hashing unit 415 configured to apply a transformation to the received CAS data to obtain transformed data, and the communication unit 412 may be configured to transmit the transformed data to the server 420 to retrieve the content access key.

The broadcast stream receiver 411 may be configured to extract a CAS control message from the received broadcast stream, and the CAS control message may include the CAS data for accessing the CAS-protected content.

Still referring to FIG. 4, in some embodiments of the disclosure, as described above, the content access key (for example, a TV key ECM) may be stored in association with data other than the original CAS ECM, such as the transformed data derived from the CAS ECM. According to embodiments of the present disclosure, the server 420 may be configured to receive the transformed data from the CAS ECM generator 401c. Optionally, the server 420 may be configured to receive the original CAS data, in this case, the CAS ECM, from the CAS ECM generator 401c shown in FIG. 4. In such embodiments of the present disclosure, when the transformed data is used to identify the content access key, a suitable transformation may be applied to the server 420 before the transformed data is stored in the memory 421.

According to an embodiment of the present disclosure, a hash transformation may be used, and the broadcast receiving apparatus 410 may further include the hashing unit 415 configured to apply a hash function to the received CAS data to obtain the transformed data in the form of a CAS ECM hash. According to an embodiment of the present disclosure, the whole CAS ECM may be hashed, or only a particular predefined portion of the CAS ECM may be hashed. When only a portion of the CAS ECM is hashed, the same predefined portion of the CAS ECM may have to be used to generate a hash stored in the memory 421 in the server 420. The communication unit 412 may be configured to transmit the hash of the CAS ECM to the server 420 for retrieving a TV key ECM.

Because, in the case of the CAS ECM, an output of the hash function includes data in an amount less than that of original input data, the CAS ECM may be transformed into an amount of data transmitted between the communication units 403 and 412 by using the hash function, thereby reducing the amount of data stored in the memory 421.

Figure 6:
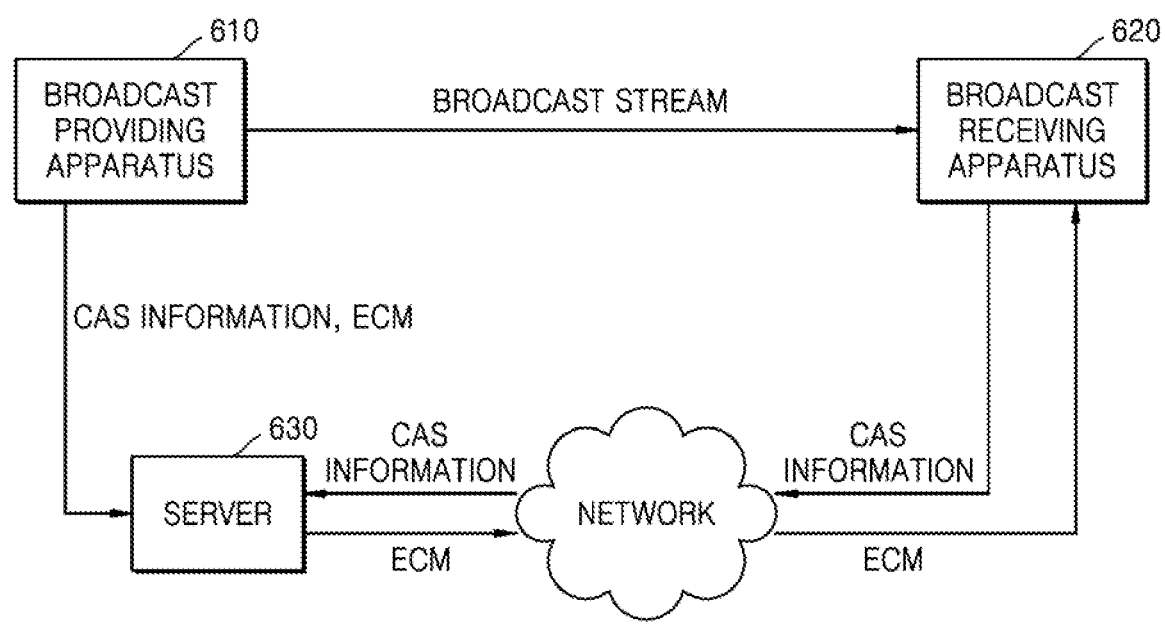
FIG. 6 is a diagram illustrating a system for processing CAS-based content, according to an embodiment of the present disclosure.

FIG. 6 is a diagram illustrating a system for processing CAS-based content, according to an embodiment of the present disclosure.

Referring to FIG. 6, the system may include a broadcast providing apparatus 610, a broadcast receiving apparatus 620, and a server 630 for providing a standard ECM.

The broadcast providing apparatus 610 may be a head-end (a broadcasting server including a video encoder, a multiplexer, a transmission system, and the like) of a broadcasting company. The broadcast providing apparatus 610 may transmit a broadcast stream including content and CAS information to the broadcast receiving apparatus 620. Here, the content included in the broadcast stream may be encrypted, and the CAS information may include a CAS ECM.

The broadcast providing apparatus 610 may generate an ECM having a preset format based on the CAS information and may store the generated ECM in association with the CAS information. The format of the ECM refers to a format capable of being decoded by the broadcast receiving apparatus 620. In addition, the ECM may correspond to the TV key ECM described above.

The broadcast providing apparatus 610 may transmit the CAS information and the generated ECM to the server 630. The server 630 may transmit the ECM to the broadcast receiving apparatus 620 according to a request from the broadcast receiving apparatus 620. Specifically, the request from the broadcast receiving apparatus 620 may include the CAS information included in the broadcast stream, and the server 630 may transmit the ECM corresponding to the CAS information to the broadcast receiving apparatus 620.

The broadcast receiving apparatus 620 may include an electronic device for receiving certain content, such as a TV or a set-top box. The broadcast receiving apparatus 620 may output the content included in the broadcast stream received from the broadcast providing apparatus 610. Here, when the content included in the broadcast stream is encrypted, the broadcast receiving apparatus 620 may decrypt the encrypted content and may output the decrypted content.

Accordingly, the broadcast receiving apparatus 620 may decrypt the encrypted content, based on the CAS information included in the broadcast stream. Here, because the CAS ECM included in the CAS information has a different format for each broadcasting business operator or each CAS vendor, certain software may need to be embedded in the broadcast receiving apparatus 620 to decode the CAS ECM. In addition, such software may have to be updated on a certain cycle.

According to an embodiment of the present disclosure, the broadcast receiving apparatus 620 may transmit the CAS information included in the broadcast stream to the server 630 via a network and may receive, from the server 630, the ECM generated by the broadcast providing apparatus 610, based on the CAS information. That is, by receiving the ECM generated in a preset format, the broadcast receiving apparatus 620 may decode the received ECM without separate software and may decrypt the encrypted content based on a decoding result.

Here, although the ECM has been described as being transmitted to the broadcast receiving apparatus 620 by the server 630 for convenience of description, it is a matter of course that the broadcast providing apparatus 610 may directly transmit the ECM to the broadcast receiving apparatus 620 by operating as the server 630.

Figure 7:
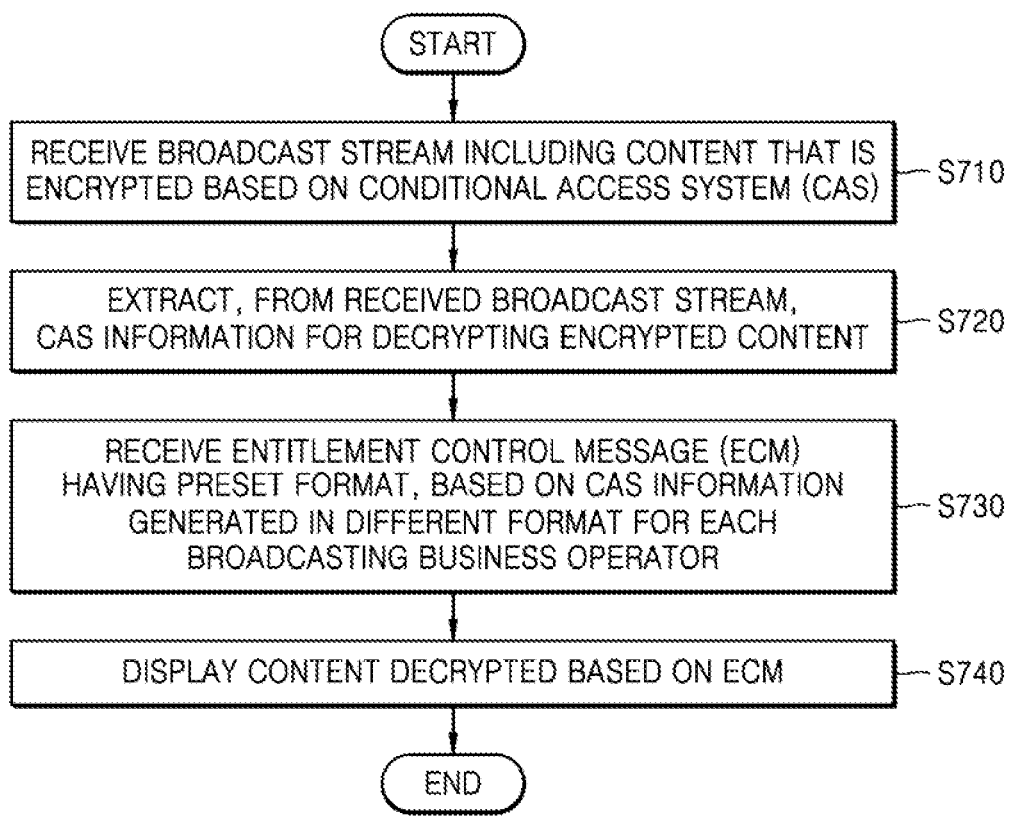
FIG. 7 is a flowchart illustrating a method of operating a broadcast receiving apparatus, according to an embodiment of the present disclosure.

FIG. 7 is a flowchart illustrating a method of operating a broadcast receiving apparatus, according to an embodiment of the present disclosure.

In operation S710, the broadcast receiving apparatus may receive a broadcast stream including content encrypted based on a CAS. Here, the broadcast stream may be received from a broadcast providing apparatus. Here, the encrypted content may be scrambled content.

In operation S720, the broadcast receiving apparatus may extract, from the received broadcast stream, CAS information for decrypting the encrypted content. The CAS information may include information for decrypting the encrypted content. For example, the CAS information may include identification information for identifying at least one of a plurality of CASs, and ECM information related to an authority to receive the content.

The identification information may include a "root URL". For example, the root URL may include anything indicating a location from which an ECM is capable of being received, such as "http://www.bbc.co.uk/". In addition, the ECM information may include information related to a CAS ECM generated in a different format for each broadcasting business operator or each CAS vendor. Specifically, the ECM information includes information related to the entitlement given to a user to receive a broadcast, and the CAS ECM refers to an ECM generated in a different format for each broadcasting business operator or each CAS vendor.

In operation S730, the broadcast receiving apparatus may receive an ECM having a preset format based on the CAS information generated in a different format for each broadcasting business operator. Accordingly, the broadcast receiving apparatus may receive the ECM having a format defined by a key of the broadcast receiving apparatus, based on the CAS ECM included in the CAS information. Here, the ECM having a preset format may be received from an external electronic device, for example, an external server. An entity providing the ECM is not limited to the external electronic device, and the ECM may be provided by a broadcast providing apparatus.

To receive the ECM from the external electronic device, the broadcast receiving apparatus may generate a hash based on the ECM. Specifically, whenever new CAS information is received through the broadcast stream, the broadcast receiving apparatus may generate a hash based on the ECM information by using a certain algorithm. In addition, the broadcast receiving apparatus may generate a URL based on the generated hash and the identification information included in the CAS information. Here, the generated URL may be generated based on text information of the hash and the "root URL".

The broadcast receiving apparatus may receive, from the external server, the ECM having a preset format based on the generated URL. For example, the broadcast receiving apparatus may retrieve the external electronic device to receive the ECM based on the generated URL and may receive the ECM corresponding to the ECM information from the retrieved external electronic device.

In operation S740, the broadcast receiving apparatus may display the content decrypted based on the ECM. To display the content, the broadcast receiving apparatus may decrypt the encrypted content based on the received ECM. Specifically, the broadcast receiving apparatus may generate control information based on the received ECM. The control information may include a control word, and the broadcast receiving apparatus may descramble the content by using the generated control word and may output the descrambled content onto a display.

Figure 8:
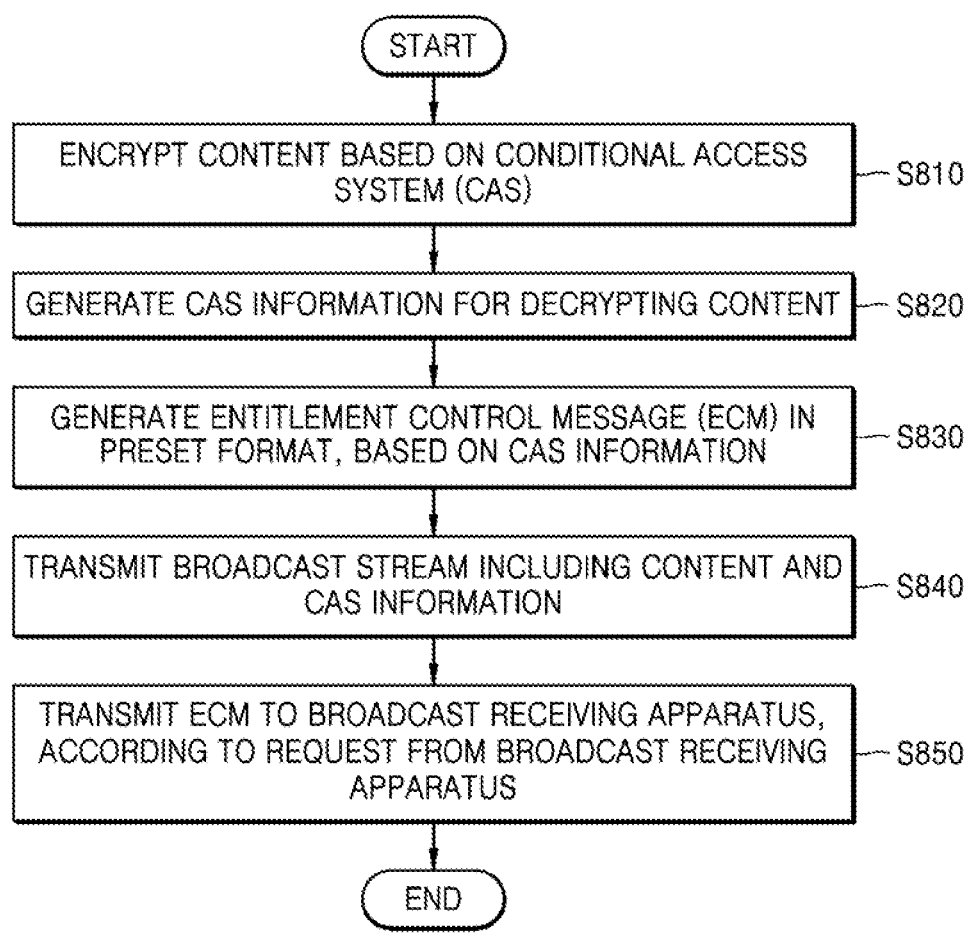
FIG. 8 is a flowchart illustrating a method of operating a broadcast providing apparatus, according to an embodiment of the present disclosure.

FIG. 8 is a flowchart illustrating a method of operating a broadcast providing apparatus, according to an embodiment of the present disclosure.

In operation S810, the broadcast providing apparatus may encrypt content based on a CAS. Specifically, the broadcast providing apparatus may scramble the content. In addition, the broadcast providing apparatus may generate control information based on the CAS and may encrypt the content by using the generated control information. The control information may include a control word randomly generated to scramble the content.

In operation S820, the broadcast providing apparatus may generate CAS information for decrypting the content. The CAS information may include information related to a CAS ECM. For example, the broadcast providing apparatus may generate the CAS information by transforming information for identifying an ECM.

In operation S830, the broadcast providing apparatus may generate the ECM in a preset format, based on the CAS information. Specifically, the broadcast providing apparatus may generate the ECM in a standard format defined by a key of a broadcast receiving apparatus such that the ECM is allowed to be decoded by the broadcast receiving apparatus. Accordingly, even though the broadcast receiving apparatus is not allowed to decode the CAS ECM included in the CAS information, the broadcast receiving apparatus is allowed to understand the ECM provided in a preset format without a separate external device or a separate program.

In operation S840, the broadcast providing apparatus may transmit a broadcast stream including the content and the CAS information to the broadcast receiving apparatus. Specifically, the broadcast stream, which includes a plurality of multiplexed broadcast services, may include CAS-protected content, and different CASs may be used for different services in the broadcast stream. In addition, the broadcast stream may include the CAS information related to the CAS ECM. Because the CAS information is the same as described above, descriptions thereof are omitted.

In operation S850, the broadcast providing apparatus may transmit the ECM to the broadcast receiving apparatus, according to a request from the broadcast receiving apparatus. Specifically, when the CAS ECM included in the CAS information is received from the broadcast receiving apparatus, the broadcast providing apparatus may transmit the ECM corresponding to the CAS ECM to the broadcast receiving apparatus via an external electronic device. The request from the broadcast receiving apparatus is not limited to the CAS ECM and may include any data requesting the ECM.

Figure 9:
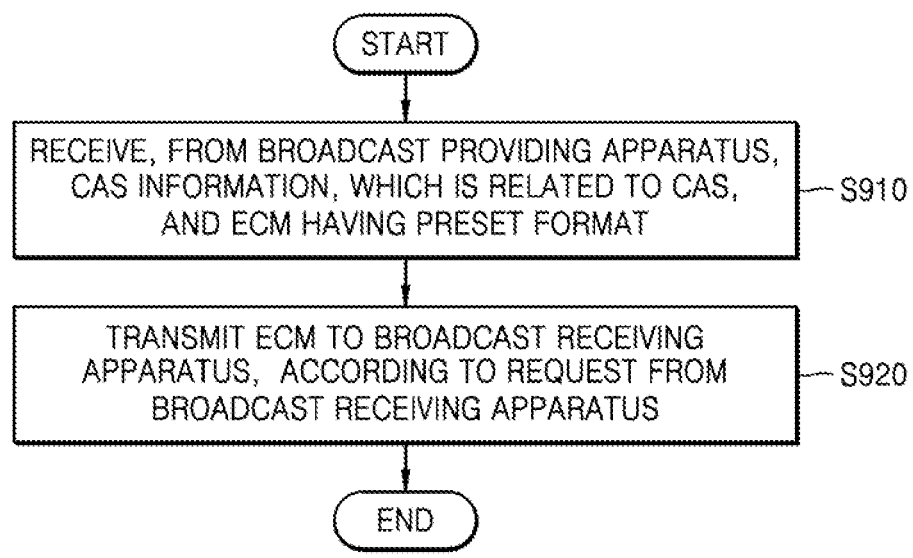
FIG. 9 is a flowchart illustrating a method of operating a server, according to an embodiment of the present disclosure.

FIG. 9 is a flowchart illustrating a method of operating a server, according to an embodiment of the present disclosure.

As described above, a broadcast receiving apparatus may receive an ECM having a preset format from a broadcast providing apparatus, directly or via an external electronic device, for example, a server. Referring to FIG. 9, the server may receive CAS information and the ECM from the broadcast providing apparatus and may transmit the ECM according to a request from the broadcast receiving apparatus.

In operation S910, the server may receive the CAS information, which is related to a CAS, and the ECM having a preset format from the broadcast providing apparatus. Here, the format of the ECM may be a standard format defined by a key of the broadcast receiving apparatus.

Figure 10:
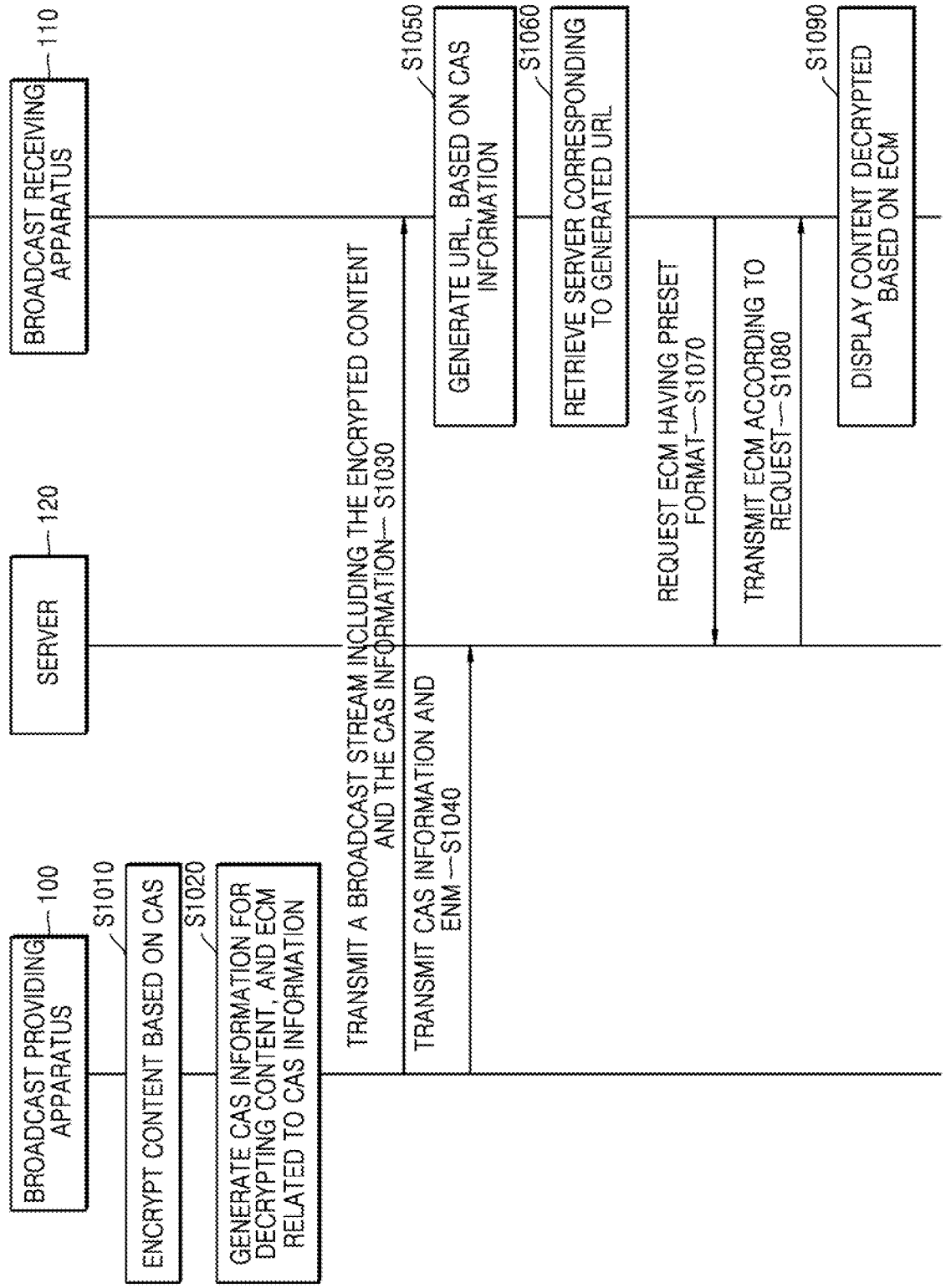
FIG. 10 is a flowchart illustrating a method of transmitting and receiving data between devices, according to an embodiment of the present disclosure.

FIG. 10 is a flowchart illustrating a method of transmitting and receiving data between devices, according to an embodiment of the present disclosure.

The broadcast providing apparatus 100 may encrypt content based on a CAS (S1010). For example, the broadcast providing apparatus 100 may generate an encryption key based on the CAS not to allow an unauthorized user to watch the content and may scramble the content by using the encryption key. Here, the encryption key may include a randomly generated control word.

In addition, the broadcast providing apparatus 100 may generate CAS information for decrypting the content, and the ECM related to the CAS information (S1020). Specifically, the broadcast providing apparatus 100 may generate the CAS information including a CAS ECM related to a viewing right of a user. Because the CAS ECM is not allowed to be decoded by the broadcast receiving apparatus 110 without a separate program or a separate external device, the broadcast providing apparatus 100 may generate, based on the CAS information, the ECM having a standard format defined by a key of the broadcast receiving apparatus 110.

The broadcast providing apparatus 100 may transmit a broadcast stream including the encrypted content and the CAS information to the broadcast receiving apparatus 110 (S1030). In addition, the broadcast providing apparatus 100 may transmit the CAS information and the ECM to the server 120 (S1040). Although there are separated operations S1030 and S1040 for convenience of description, operations S1030 and S1040 may be performed substantially at the same time, or operation S1030 may be performed after operation S1040.

The broadcast receiving apparatus 110 may generate a URL based on the CAS information (S1050). Specifically, the broadcast receiving apparatus 110 may generate a hash of the CAS ECM, based on the CAS information. In addition, the broadcast receiving apparatus 110 may generate the URL for obtaining the ECM, based on a root URL that indicates a domain of an external electronic device providing the hash of the CAS ECM and the ECM.

The broadcast receiving apparatus 110 may retrieve the server 120 corresponding to the generated URL (S1060). In addition, the broadcast receiving apparatus 110 may request the ECM having a preset format from the server 120. Specifically, the broadcast receiving apparatus 110 may request the ECM from the server 120, based on information of the server 120 providing the hash of the CAS ECM and the ECM, the information being included in the URL.

The server 120 may transmit the ECM according to the request to the broadcast receiving apparatus 110 (S1080). Here, the ECM may be generated in a standard format capable of being decoded by a key of the broadcast receiving apparatus 110. The broadcast receiving apparatus 110 may display the content decrypted based on the ECM (S1090). The broadcast receiving apparatus 110 may generate control information based on the ECM and may decrypt the content based on the generated control information. In addition, the broadcast receiving apparatus 110 may display the decrypted content.

Figure 11:
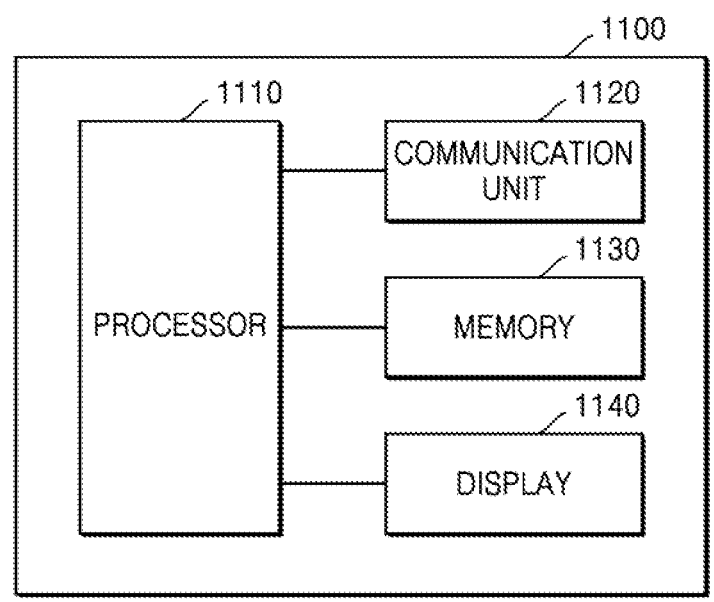
FIG. 11 is a block diagram illustrating an internal configuration of a broadcast receiving apparatus, according to an embodiment of the present disclosure.

FIG. 11 is a block diagram illustrating an internal configuration of a broadcast receiving apparatus, according to an embodiment of the present disclosure.

A broadcast receiving apparatus 1100 may correspond to the broadcast receiving apparatuses 110, 410, 510, and 610 described with reference to FIGS. 1, 4, 5, and 6. Therefore, regarding the broadcast receiving apparatus 1100, repeated descriptions given as to the broadcast receiving apparatuses 110, 410, 510, and 610 of FIGS. 1, 4, 5, and 6 are omitted.

Referring to FIG. 11, the broadcast receiving apparatus 1100 according to an embodiment of the present disclosure may include a communication unit 1120, a memory 1130 storing at least one instruction, a display 1140, and at least one processor 1110 configured to execute the at least one instruction to control the broadcast receiving apparatus 1100. However, not all the components shown in FIG. 11 are necessary components of the broadcast receiving apparatus 1100. The broadcast receiving apparatus 1100 may be implemented by components more than the components shown in FIG. 11 or by components fewer than the components shown in FIG. 11.

According to an embodiment of the present disclosure, the at least one processor 1110 may be configured to execute the at least one instruction to: receive a broadcast stream including content encrypted based on a CAS; extract, from the received broadcast stream, CAS information for decrypting the encrypted content; receive an ECM having a preset format based on the CAS information generated in a different format for each broadcasting business operator; and display the content decrypted based on the ECM. That is, the at least one processor 1110 may take overall control of operations of the broadcast receiving apparatus 1100.

The communication unit 1120 may transmit data for decrypting the content to and receive data for decrypting the content from an external electronic device, for example, an external server, via a network. For example, the communication unit 1120 may receive the broadcast stream from at least one broadcast providing apparatus connected to the network. Here, the broadcast receiving apparatus 1100 may receive the broadcast stream in a broadcast manner. In addition, to decrypt the content included in the received broadcast stream, the broadcast receiving apparatus 1100 may transmit certain information to and receive certain information from the external server. That is, the at least one processor 1110 may perform control such that the certain information for decrypting the content is transmitted to and received from the external electronic device via the communication unit 1120.

To transmit the certain information to and receive the certain information from at least one external electronic device connected to the network, the communication unit 1120 may include at least one of a short-range communication module (not shown) conforming to a short-range communication technique, a wired communication module (not shown), or a mobile communication module (not shown).

The short-range communication module (not shown) refers to a module for short-range communication within a certain distance. According to an embodiment of the present disclosure, the short-range communication technique may include, but is not limited to, a wireless local area network (LAN), Wi-Fi, Bluetooth, Zigbee, Wi-Fi Direct (WFD), ultra wideband (UWB), infrared Data Association (IrDA), Bluetooth Low Energy (BLE), Near Field Communication (NFC), or the like.

The wired communication module (not shown) refers to a module for communication using electrical signals or optical signals, and a wired communication technique according to an embodiment of the present disclosure may include a pair cable technique, a coaxial cable technique, an optical fiber technique, an Ethernet cable technique, or the like.

The mobile communication module (not shown) transmits radio signals to and receives radio signals from at least one of a base station, an external terminal, or a server on a mobile communication network. Here, the radio signals may include various types of data according to transmission and reception of voice call signals, video call signals, or text/multimedia messages.

The memory 1130 may store at least one instruction. In addition, the memory 1130 may store a certain program and/or data or information.

According to an embodiment of the present disclosure, the memory 1130 may store at least one of pieces of information for decrypting the content received from the broadcast providing apparatus via the communication unit 1120.

The memory 1130 may include various types of storage media. For example, the memory 1130 may include at least one of a flash memory type storage medium, a hard disk type storage medium, a multimedia card micro type storage medium, card type memory (for example, SD memory, XD memory, or the like), random access memory (RAM), static random access memory (SRAM), read-only memory (ROM), electrically erasable programmable read-only memory (EEPROM), programmable read-only memory (PROM), magnetic memory, a magnetic disk, or an optical disk.

Specifically, the memory 1130 may store the CAS information, a hash of a CAS ECM, a root URL, a URL, and the ECM. In addition, the memory 1130 may update and store the CAS information obtained by the at least one processor 1110.

Figure 12:
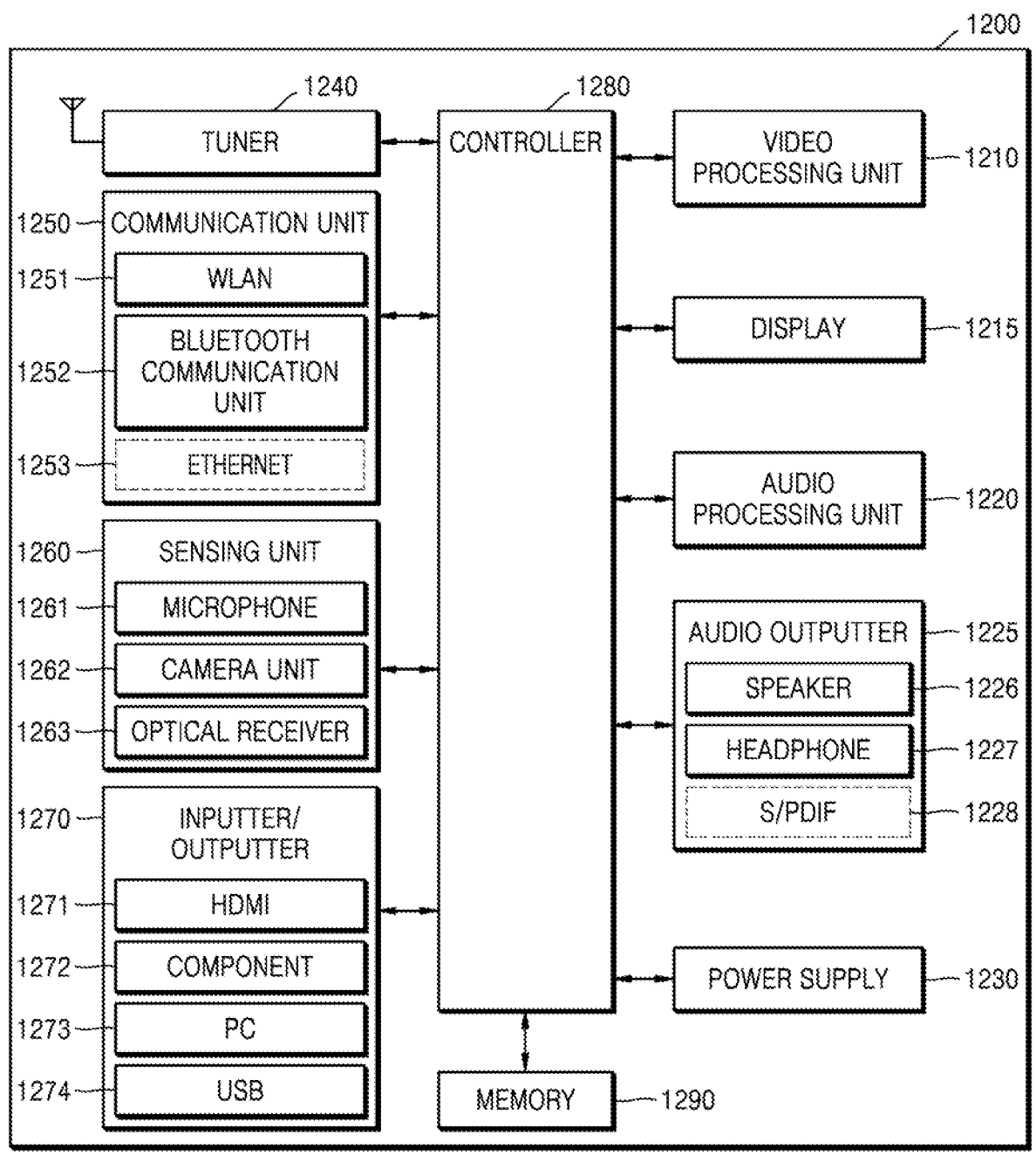
FIG. 12 is a block diagram illustrating a detailed internal configuration of a broadcast receiving apparatus, according to an embodiment of the present disclosure.

FIG. 12 is a block diagram illustrating a detailed internal configuration of a broadcast receiving apparatus, according to an embodiment of the present disclosure.

A broadcast receiving apparatus 1200 according to an embodiment of the present disclosure may correspond to each broadcast receiving apparatus described with reference to FIGS. 1 to 11. Specifically, both a communication unit 1250 and a tuner 1240, a controller 1280, a display 1215, and a memory 1290 of the broadcast receiving apparatus 1200 may respectively correspond to the communication unit 1120, the at least one processor 1110, the display 1140, and the memory 1130 of the broadcast receiving apparatus 1100 shown in FIG. 11. For example, the at least one processor 1110 may be included in the controller 1280. In addition, the broadcast receiving apparatus 1200 may further include a component corresponding to a user interface (not shown), in addition to the components shown in FIG. 12.

Therefore, regarding the broadcast receiving apparatus 1200, repeated descriptions given with reference to FIGS. 1 to 11 are omitted.

Referring to FIG. 12, the broadcast receiving apparatus 1200 includes a video processing unit 1210, a display 1215, an audio processing unit 1220, an audio outputter 1225, a power supply 1230, a tuner 1240, a communication unit 1250, a sensing unit 1260, an inputter/outputter 1270, a controller 1280, and a memory 1290.

The video processing unit 1210 performs processing on video data received by the broadcast receiving apparatus 1200. The video processing unit 1210 may perform various image processing, such as decoding, scaling, noise filtering, frame rate conversion, and resolution conversion, on the video data. For example, decoding of content included in a received broadcast stream may be performed by the video processing unit 1210 according to control by the controller 1280.

The controller 1280 may receive a request to record the video data processed by the video processing unit 1210 and may control the video data to be encrypted or decrypted to be recorded on a memory device (not shown), for example, RAM (not shown), which is included in the controller 1280 or the memory 1290.

The display 1215 displays a video, which is included in a broadcast signal received via the tuner 1240, on a screen, by control by the controller 1280. In addition, the display 1215 may display content (for example, a moving image) that is input via the communication unit 1250 or the inputter/outputter 1270.

Further, the display 1215 may output an image stored in the memory 1290, by control by the controller 1280. In addition, the display 1215 may display a speech user interface (UI) (for example, including a speech command guide) for performing a speech recognition task corresponding to speech recognition, or a motion UI (for example, including a user motion guide for motion recognition) for performing a motion recognition task corresponding to motion recognition.

The audio processing unit 1220 performs processing on audio data. The audio processing unit 1220 may perform various processing, such as decoding, amplification, and noise filtering, on the audio data. The audio processing unit 1220 may include a plurality of audio processing modules to process audio corresponding to a plurality of pieces of content.

The audio outputter 1225 outputs audio included in the broadcast signal received through the tuner 1240, by control by the controller 1280. The audio outputter 1225 may output audio (for example, a speech or a sound) that is input through the communication unit 1250 or the inputter/outputter 1270. In addition, the audio outputter 1225 may output audio stored in the memory 1290, by control by the controller 1280. The audio outputter 1225 may include at least one of a speaker 1226, a headphone output terminal 1227, or a Sony/Philips Digital Interface (S/PDIF) output terminal 1228. The audio outputter 1225 may include a combination of the speaker 1226, the headphone output terminal 1227, and the S/PDIF output terminal 1228.

The power supply 1230 supplies power, which is input from an external power source, to the components (1210 to 1290) inside the broadcast receiving apparatus 1200, by control by the controller 1280. In addition, the power supply 1230 may supply power, which is output from one or more batteries (not shown) inside the broadcast receiving apparatus 1200, to the components (1210 to 1290) inside the broadcast receiving apparatus 1200, by control by the controller 1280.

The tuner 1240 may tune and select only a frequency of a channel intended to be received by the broadcast receiving apparatus 1200 from among a lot of radio wave components through amplification, mixing, resonance, and the like of a broadcast signal received in a wired or wireless manner. The broadcast signal includes audio, video, and side information (for example, an electronic program guide (EPG)).

The tuner 1240 may receive the broadcast signal in a certain frequency band according to an external input (for example, as a received control signal, an external input through a High-Definition Multimedia Interface (HDMI), Digital Visual Interface (DVI), or DisplayPort (DP) port). Here, the external input may include a control signal received from an external control device (not shown), a remote controller (not shown), or the like, for example, a channel number input, a channel up-down input, a channel input via an EPG screen, or the like.

The tuner 1240 may receive the broadcast signal from various sources such as terrestrial broadcasts, cable broadcasts, satellite broadcasts, and Internet broadcasts. The tuner

1240 may receive the broadcast signal from a source such as analog broadcasts or digital broadcasts. The broadcast signal received by the tuner 1240 undergoes decoding (for example, audio decoding, video decoding, or side information decoding) to be divided into audio, video, and/or side information. The divided audio, video, and/or side information may be stored in the memory 1290 by control by the controller 1280.

The broadcast receiving apparatus 1200 may include one tuner 1240 or a plurality of tuners 1240. When the plurality of tuners 1240 are provided according to an embodiment of the present disclosure, a plurality of broadcast signals may be respectively output to a plurality of windows that constitute a multi-window screen provided to the display 1215.

The tuner 1240 may be implemented in an all-in-one type together with the broadcast receiving apparatus 1200 or may be implemented by a separate device having a tuner electrically connected to the broadcast receiving apparatus 1200 (for example, a set-top box (not shown), or a tuner (not shown) connected to the inputter/outputter 1270).

The communication unit 1250 may connect the broadcast receiving apparatus 1200 to an external electronic device (for example, a broadcast providing apparatus or a server) by control by the controller 1280. The controller 1280 may perform transmission and reception of certain information or certain content between the controller 1280 and the external electronic device connected thereto via the communication unit 1250, or may download an application from the external electronic device or perform web browsing, via the communication unit 1250. Specifically, the controller 1280 may be connected to a network via the communication unit 1250 and may receive content from the external electronic device (not shown).

As described above, the communication unit 1250 may include at least one of a short-range communication module (not shown), a wired communication module (not shown), or a mobile communication module (not shown).

FIG. 12 illustrates an example in which the communication unit 1250 includes one of a WLAN unit 1251, a Bluetooth unit 1252, a wired Ethernet unit 1253.

In addition, the communication unit 1250 may include a combination of the WLAN unit 1251, the Bluetooth unit 1252, and the wired Ethernet unit 1253. Further, the communication unit 1250 may receive a control signal of a control device (not shown) by control by the controller 1280. The control signal may be implemented in a Bluetooth type, a radio frequency (RF) signal type, or a Wi-Fi type.

The communication unit 1250 may further include another short-range communication unit (for example, a near field communication (NFC) unit (not shown), or a separate Bluetooth low energy (BLE) unit (not shown)) in addition to the Bluetooth unit 1252.

In addition, in FIG. 12, both the tuner 1240 and the communication unit 1250 are components corresponding to the communication unit 1120 of FIG. 11, and the communication unit 1250 may also be implemented to include the tuner 1240.

The sensing unit 1260 may sense speeches, images, or interactions of a user.

A microphone 1261 receives a speech uttered by the user. The microphone 1261 may convert the received speech into an electric signal and output the electric signal to the controller 1280. The speech of the user may include, for example, a speech corresponding to a menu or a function of the broadcast receiving apparatus 1200. For example, a recognition range of the microphone 1261 is recommended to be within 4 m from the microphone 1261 to a location of the user, and the recognition range of the microphone 1261 may vary in correspondence with a voice volume of the user and surrounding environments (for example, speaker sounds or ambient noise).

The microphone 1261 may be integrated with or separated from the broadcast receiving apparatus 1200. The separated microphone 1261 may be electrically connected to the broadcast receiving apparatus 1200 via the communication unit 1250 or the inputter/outputter 1270.

It will be easily understood by one of ordinary skill in the art that the microphone 1261 may be excluded according to the capabilities and structure of the broadcast receiving apparatus 1200.

The camera unit 1262 receives images (for example, consecutive frames) corresponding to motions of the user, which include gestures, in a camera recognition range. For example, a recognition range of the camera unit 1262 may be a distance of 0.1 m to 5 m from the camera unit 1262 to the user. The motions of the user may include, for example, motions of a portion of the user or a portion of the body of the user, such as a face, a facial expression, a hand, a fist, or a finger of the user. The camera unit 1262 may convert the received images into electrical signals and output the electrical signals to the controller 1280, according to control by the controller 1280.

The controller 1280 may select a menu displayed on the broadcast receiving apparatus 1200 by using a recognition result of the received motion or may perform control corresponding to the motion recognition result. For example, the control performed by the controller 1280 may include a channel adjustment, a volume adjustment, an indicator movement, or the like.

The camera unit 1262 may include a lens (not shown) and an image sensor (not shown). The camera unit 1262 may support optical zoom or digital zoom by using a plurality of lenses and image processing. A recognition range of the camera unit 1262 may be variously set according to a camera angle and ambient environmental conditions. When the camera unit 1262 includes a plurality of cameras, the camera unit 1262 may receive a three-dimensional image or a three-dimensional motion by using the plurality of cameras.

The camera unit 1262 may be integrated with or separated from the broadcast receiving apparatus 1200. A separate device (not shown) including the separated camera unit 1262 may be electrically connected to the broadcast receiving apparatus 1200 via the communication unit 1250 or the inputter/outputter 1270.

It will be easily understood by one of ordinary skill in the art that the camera unit 1262 may be excluded according to the capabilities and structure of the broadcast receiving apparatus 1200.

An optical receiver 1263 receives an optical signal (including a control signal), which is received from an external control device (not shown), through an optical window (not shown) of a bezel of the display 1215. The optical receiver 1263 may receive an optical signal corresponding to a user input (for example, a touch, a press, a touch gesture, a speech, or a motion) from a control device (not shown). A control signal may be extracted from the received optical signal by control by the controller 1280.

For example, the optical receiver 1263 may receive a signal corresponding to a pointing position of the control device (not shown) and transmit the signal to the controller 1280. For example, in the case where a user interface screen for receiving data or a command that is input from the user via the display 1215 has been output and the user intends to input data or a command to the broadcast receiving apparatus 1200 via the control device (not shown), when the control device (not shown) is moved while a finger of the user is in contact with a touch pad (not shown) provided to the control device (not shown), the optical receiver 1263 may receive a signal corresponding to the movement of the control device (not shown) and transmit the signal to the controller 1280. In addition, the optical receiver 1263 may receive a signal, which indicates that a certain button provided to the control device (not shown) is pressed, and may transmit the signal to the controller 1280. For example, when the user presses a touch pad, which is provided in a button type in the control device (not shown), with a finger thereof, the optical receiver 1263 may receive a signal indicating that the button-type touch pad (not shown) is pressed, and may transmit the signal to the controller 1280. For example, the signal indicating that the button-type touch pad (not shown) is pressed may be used as a signal for selecting one of items.

The inputter/outputter 1270 receives a video (for example, a moving image or the like), audio (for example, a speech, music, or the like), side information (for example, an EPG or the like), and the like from outside the broadcast receiving apparatus 1200, by control by the controller 1280. The inputter/outputter 1270 may include one of a HDMI port 1271, a component jack 1272, a personal computer (PC) port 1273, and a USB port 1274. The inputter/outputter 1270 may include a combination of the HDMI port 1271, the component jack 1272, the PC port 1273, and the USB port 1274.

It will be easily understood by one of ordinary skill in the art that the configuration and operation of the inputter/outputter 1270 may be variously implemented according to embodiments of the present disclosure.

The controller 1280 controls overall operations of the broadcast receiving apparatus 1200 and signal flows between the internal components (not shown) of the broadcast receiving apparatus 1200 and processes data. When there is an input by the user or preset and stored conditions are satisfied, the controller 1280 may execute an operating system (OS) and various applications, which are stored in the memory 1290.

The controller 1280 may include: RAM (not shown), which stores signals or data input from outside the broadcast receiving apparatus 1200 or is used as a storage region corresponding to various tasks performed by the broadcast receiving apparatus 1200; ROM (not shown) in which a control program for controlling the broadcast receiving apparatus 1200 is stored; and a processor (not shown).

The processor (not shown) may include a graphic processing unit (GPU, not shown) for processing graphics corresponding to a video. The processor (not shown) may be implemented by a system-on-chip (SoC) in which a core (not shown) is integrated with a GPU (not shown). The processor (not shown) may include a single core, dual cores, triple cores, quadruple cores, and cores by as many as multiples thereof.

In addition, the processor (not shown) may include a plurality of processors. For example, the processor (not shown) may be implemented by both a main processor (not shown) and a sub-processor (not shown) that operates in a sleep mode.

The GPU (not shown) generates a screen including various objects such as icons, images, and texts, by using an arithmetic unit (not shown) and a rendering unit (not shown). The arithmetic unit calculates attribute values, such as coordinate values, shapes, sizes, and colors, for displaying respective objects according to a layout of the screen, by using user interactions sensed by the sensing unit 1260. The rendering unit generates the screen having various layouts including the objects, based on the attribute values calculated by the arithmetic unit. The screen generated by the rendering unit is displayed in a display region of the display 1215.

Figure 13:
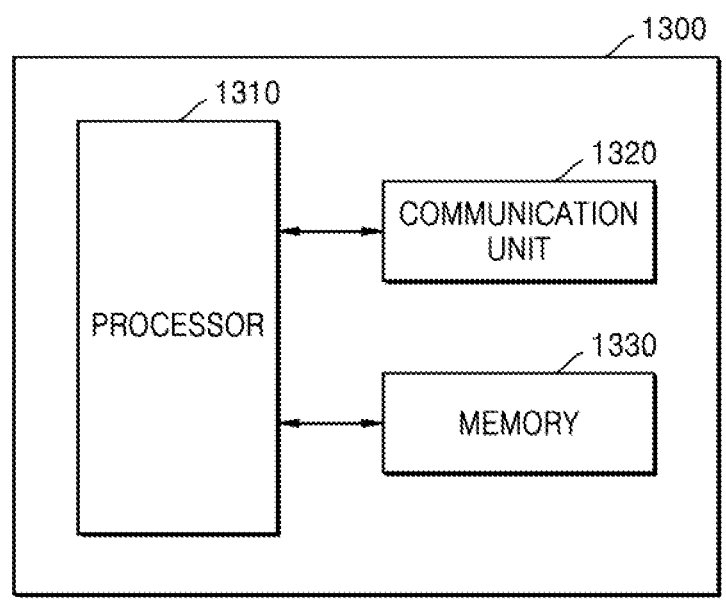
FIG. 13 is a block diagram illustrating an internal configuration of a broadcast providing apparatus, according to an embodiment of the present disclosure.

FIG. 13 is a block diagram illustrating an internal configuration of a broadcast providing apparatus, according to an embodiment of the present disclosure.

A broadcast providing apparatus 1300 may correspond to the broadcast providing apparatuses 100, 400, and 620 described with reference to FIGS. 1 to 10. Therefore, regarding the broadcast providing apparatus 1300, repeated descriptions given as to the broadcast providing apparatuses 100, 400, and 620 of FIGS. 1 to 10 are omitted.

The broadcast providing apparatus 1300 includes a communication unit 1320, a memory 1330 storing at least one instruction, and at least one processor 1310 configured to execute the at least one instruction to control the broadcast providing apparatus 1300. The communication unit 1320 may correspond to the broadcast stream transmitters 102 and 402 and the communication unit 103, which have been described with reference to FIGS. 1 to 5.

According to an embodiment of the present disclosure, the at least one processor 1310 may encrypt content based on a CAS, may generate CAS information for decrypting the content, may generate an ECM in a preset format based on the CAS information, may transmit a broadcast stream including the content and the CAS information to a broadcast receiving apparatus, and may transmit the ECM to the broadcast receiving apparatus according to a request from the broadcast receiving apparatus.

According to an embodiment of the present disclosure, the at least one processor 1310 may encrypt, for example, may scramble the content, based on the CAS. Specifically, the at least one processor 1310 may generate control information based on the CAS and may encrypt the content by using the generated control information.

In addition, the at least one processor 1310 may generate the CAS information for decrypting the content and may generate the ECM in a preset format based on the generated CAS information. Further, the communication unit 1320 may transmit the broadcast stream including the content and the CAS information to the broadcast receiving apparatus, according to control by the at least one processor 1310. In addition, the communication unit 1320 may transmit the ECM, which corresponds to the request from the broadcast receiving apparatus, to the broadcast receiving apparatus, according to control by the at least one processor 1310. Here, the communication unit 1320 may transmit the ECM to the broadcast receiving apparatus via an external electronic device, for example, a server.

According to an embodiment of the present disclosure, the memory 1330 may store at least one of pieces of information for encrypting and decrypting the content. For example, the memory 1330 may store the encrypted content, the CAS information for decrypting the content, and the ECM. In addition, the memory 1330 may update and store data obtained by the at least one processor 1310.

Figure 14:
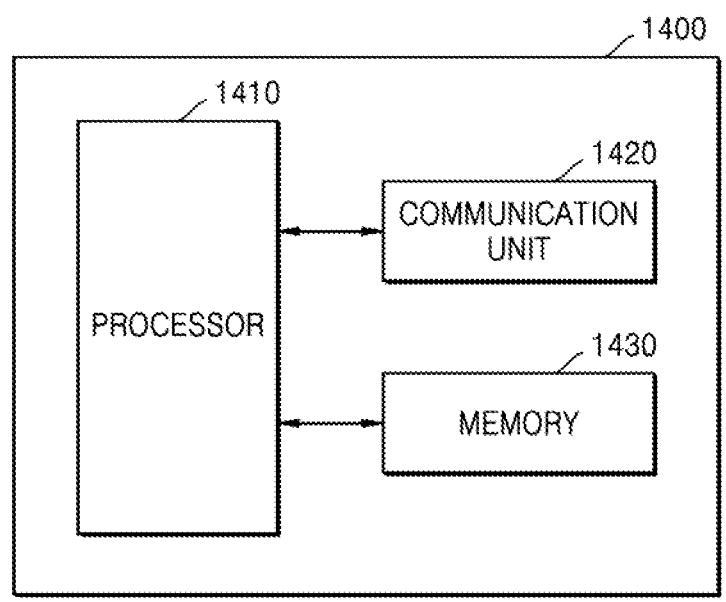
FIG. 14 is a block diagram illustrating an internal configuration of a server, according to an embodiment of the present disclosure.

FIG. 14 is a block diagram illustrating an internal configuration of a server, according to an embodiment of the present disclosure.

According to an embodiment of the present disclosure, a server 1400 may be included in the external electronic devices described with reference to FIGS. 1 to 13. Specifically, the server 1400 refers to an external electronic device that provides an ECM to a broadcast receiving apparatus.

For example, the server 1400 may correspond to the servers 420 and 630 described with reference to FIGS. 1 to 10. Thus, regarding the server 1400, repeated descriptions given as to the servers 420 and 630 of FIGS. 1 to 10 are omitted.

The server 1400 includes a communication unit 1420, a memory storing at least one instruction, and at least one processor 1410 configured to execute the at least one instruction to control the server 1400.

The at least one processor 1410 may receive CAS information, which is related to a CAS, and an ECM having a preset format from a broadcast providing apparatus via the communication unit 1420. The at least one processor 1410 may generate the ECM having a preset format by receiving the CAS information from the broadcast providing apparatus. The communication unit 1420 may be controlled to receive a request from a broadcast receiving apparatus according to control by the at least one processor 1410 and may transmit the ECM to the broadcast receiving apparatus.

According to an embodiment of the present disclosure, the memory 1430 may store data transmitted to and received from the broadcast providing apparatus and the broadcast receiving apparatus. For example, the memory 1430 may store the CAS information for decrypting content, and the ECM. In addition, the memory 1430 may update and store data obtained by the at least one processor 1410.

Although the present disclosure has been described with reference to particular embodiments in conjunction with the accompanying drawings, it will be understood that various modifications and changes may be made without departing from the spirit and scope of the present disclosure.

Some embodiments of the present disclosure may be implemented in the form of a recording medium including instructions, which are capable of being by a computer, such as a program module executed by the computer. A computer-readable medium may be any available medium accessible by a computer and may include volatile and non-volatile media and separable and non-separable media. In addition, the computer-readable medium may include a computer storage medium. The computer storage medium includes volatile and non-volatile media and separable and non-separable media, which are implemented by any method or technique for storing information such as computer-readable instructions, data structures, program modules, or other data.

A method of operating a display device, according to some embodiments of the present disclosure, may be implemented in the form of program instructions executable through various computer means and recorded on the computer-readable medium. The computer-readable medium described above may include program instructions, data files, data structures, or the like alone or in combination. The program instructions recorded on the above-described medium may be specially designed and configured for the present disclosure or may be known to those of ordinary skill in the art of computer software and available. The computer-readable medium described above may be included in a computer program product.

Examples of a computer-readable recording medium include magnetic media such as a hard disk, a floppy disk, and magnetic tape, optical media such as CD-ROM and a digital versatile disc (DVD), magneto-optical media such as a floptical disk, and hardware devices specially configured to store and execute program instructions, such as ROM, RAM, and flash memory. Examples of the program instructions include machine language code made by a compiler, and high-level language code capable of being executed by a computer by using an interpreter or the like.

In addition, the term such as " . . . unit" or " . . . portion" used herein may refer to a hardware component such as a processor or a circuit, and/or a software component executed by the hardware component such as a processor.

It will be understood by one of ordinary skill in the art that the embodiments of the present disclosure are provide for illustration and may be implemented in different ways without departing from the spirit and scope of the disclosure. Therefore, it should be understood that the foregoing embodiments of the present disclosure are provided for illustrative purposes only and are not to be construed in any way as limiting the present disclosure. For example, each component described as a single type may be implemented in a distributed manner, and likewise, components described as being distributed may be implemented as a combined type.

The scope of the present disclosure should be defined by the appended claims and equivalent thereof, and any changes or modifications derived from the appended claims and equivalents thereof should be construed as falling within the scope of the present disclosure.

The invention claimed is:

1. A method of operating a broadcast receiving apparatus, the method comprising:
  receiving, from a broadcast providing apparatus, a broadcast stream that comprises content encrypted based on a conditional access system (CAS);
  extracting, from the received broadcast stream, CAS information for decrypting the encrypted content, wherein the CAS information includes identification information for identifying at least one of a plurality of CASs;
  generating a uniform resource locator (URL) corresponding to the identification information;
  receiving, from an external electronic apparatus, an entitlement control message (ECM) having a preset format based on the CAS information, the external electronic apparatus being different from the broadcast providing apparatus; and
  displaying the content decrypted based on the ECM,
  wherein the receiving of the ECM comprises receiving the ECM based on the URL, and
  wherein the CAS information includes CAS data generated in a different format for each of a plurality of broadcasting business operators.

2. The method of claim 1, wherein the displaying of the content comprises decrypting the content by using control information generated based on the ECM.

3. The method of claim 1, wherein the CAS information further comprises ECM information related to an authority to receive the content.

4. The method of claim 3, further comprising:
  generating a hash based on the ECM information,
  wherein the generating of the URL comprises generating the URL based on the hash and the identification information.

5. The method of claim 4, wherein the receiving of the ECM comprises:
  identifying the external electronic apparatus corresponding to the URL; and
  receiving the ECM corresponding to the CAS information from the external electronic apparatus.

6. A broadcast receiving apparatus comprising:
  a display;
  a communication unit;
  a memory storing at least one instruction; and at least one processor configured to execute the at least one instruction to control the broadcast receiving apparatus, wherein the at least one processor is configured to execute the at least one instruction to:

receive, from a broadcast providing apparatus, a broadcast stream that comprises content encrypted based on a conditional access system (CAS);

extract, from the received broadcast stream, CAS information for decrypting the encrypted content, wherein the CAS information includes identification information for identifying at least one of a plurality of CASs;

generate a uniform resource locator (URL) corresponding to the identification information;

receive, from an external electronic apparatus, an entitlement control message (ECM) having a preset format based on the CAS information via the communication unit, the external electronic apparatus being different from the broadcast providing apparatus; and display the content decrypted based on the ECM, wherein the at least one processor is further configured to execute the at least one instruction to receive the ECM based on the URL, and wherein the CAS information includes CAS data generated in a different format for each of a plurality of broadcasting business operators.

7. The broadcast receiving apparatus of claim 6, wherein the at least one processor is further configured to execute the at least one instruction to decrypt the content by using control information generated based on the ECM.

8. The broadcast receiving apparatus of claim 6, wherein the CAS information further comprises ECM information related to an authority to receive the content.

9. The broadcast receiving apparatus of claim 8, wherein the at least one processor is further configured to execute the at least one instruction to:
generate a hash based on the ECM information; and
generate the URL based on the hash and the identification information.

10. The broadcast receiving apparatus of claim 9, wherein the at least one processor is further configured to execute the at least one instruction to:
identify the external electronic apparatus corresponding to the URL; and
receive the ECM corresponding to the CAS information from the external electronic apparatus.

11. A non-transitory computer-readable recording medium having stored therein a program for performing a method comprising:
receiving, by a broadcast receiving apparatus, a broadcast stream that comprises content encrypted based on a conditional access system (CAS) from a broadcast providing apparatus;
extracting, by the broadcast receiving apparatus, from the received broadcast stream, CAS information for decrypting the encrypted content, wherein the CAS information includes identification information for identifying at least one of a plurality of CASs;
generating a uniform resource locator (URL) corresponding to the identification information;
receiving, by the broadcast receiving apparatus, an entitlement control message (ECM) having a preset format based on the CAS information from an external electronic apparatus being different from the broadcast providing apparatus; and
displaying, by the broadcast receiving apparatus, the content decrypted based on the ECM,
wherein the receiving of the ECM comprises receiving the ECM based on the URL, and
wherein the CAS information includes CAS data generated in a different format for each of a plurality of broadcasting business operators.

12. The non-transitory computer-readable recording medium of claim 11, wherein the displaying of the content comprises decrypting the content by using control information generated based on the ECM.

13. The non-transitory computer-readable recording medium of claim 11, wherein the CAS information further comprises ECM information related to an authority to receive the content.

14. The non-transitory computer-readable recording medium of claim 13, wherein the method further comprises:
generating a hash based on the ECM information, and
wherein the generating of the URL comprises generating the URL based on the hash and the identification information.

15. The non-transitory computer-readable recording medium of claim 14, wherein the receiving of the ECM comprises:
identifying the external electronic apparatus corresponding to the URL; and
receiving the ECM corresponding to the CAS information from the external electronic apparatus.

* * * * *